United States Patent
McCabe et al.

(10) Patent No.: US 12,380,757 B1
(45) Date of Patent: *Aug. 5, 2025

(54) CLOUD-BASED CASH INVENTORY MANAGEMENT FOR ON-PREMISES CASH HANDLING DEVICES

(71) Applicant: G4S Retail Solutions (USA) Inc., Jupiter, FL (US)

(72) Inventors: Brian McCabe, Jupiter, FL (US); Wilfredo Rego, Jupiter, FL (US)

(73) Assignee: G4S Retail Solutions (USA) Inc., Jupiter, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,012

(22) Filed: Apr. 26, 2024

Related U.S. Application Data

(63) Continuation of application No. 18/166,659, filed on Feb. 9, 2023, now Pat. No. 12,002,319, which is a continuation of application No. 17/182,704, filed on Feb. 23, 2021, now Pat. No. 11,615,665, which is a continuation of application No. 16/516,026, filed on Jul. 18, 2019, now Pat. No. 10,977,889.

(Continued)

(51) Int. Cl.
| | | |
|---|---|---|
| G07F 19/00 | (2006.01) | |
| G06Q 20/20 | (2012.01) | |
| G07D 11/23 | (2019.01) | |
| G07D 11/34 | (2019.01) | |
| G07D 11/40 | (2019.01) | |

(52) U.S. Cl.
CPC .......... *G07D 11/23* (2019.01); *G06Q 20/202* (2013.01); *G07D 11/34* (2019.01); *G07D 11/40* (2019.01)

(58) Field of Classification Search
CPC ...... G06Q 40/02; G06Q 20/20; G06Q 20/405; G06Q 20/1085; G07F 19/202; G07F 19/203; G07D 11/245; G07D 11/34; G07D 11/40
USPC ......................................... 235/379, 380, 383
See application file for complete search history.

(56) References Cited

U.S. PATENT DOCUMENTS

| 5,553,320 A | 9/1996 | Matsuura |
|---|---|---|
| 7,610,215 B1 | 10/2009 | Folk et al. |
| (Continued) | | |

OTHER PUBLICATIONS

U.S. Appl. No. 18/166,659, filed Feb. 9, 2023, U.S. Pat. No. 12,002,319, Issued.

(Continued)

*Primary Examiner* — Daniel St Cyr
(74) *Attorney, Agent, or Firm* — Alston & Bird LLP

(57) ABSTRACT

Various embodiments are directed to systems and methods for remotely monitoring cash reserves within a plurality of cash handling devices, and for automatically initiating change orders to maintain optimal levels of cash reserves within those cash handling devices. Certain embodiments remotely monitor closing transaction data received from those cash handling devices. Based at least in part on portions of data reflected within the closing transaction data, retrieve historical usage data relating to a forecast period; generate a usage forecast for the forecast period, and based on the generated usage forecast and the closing transaction data, generate message data for transmission to external systems to facilitate the maintenance of optimal cash reserves within those cash handling devices.

12 Claims, 14 Drawing Sheets

Related U.S. Application Data

(60) Provisional application No. 62/700,072, filed on Jul. 18, 2018.

(56) References Cited

U.S. PATENT DOCUMENTS

| | | | |
|---|---|---|---|
| 7,635,085 B2 | 12/2009 | Brown et al. |
| 7,900,829 B1 | 3/2011 | Folk et al. |
| 7,940,176 B2 | 5/2011 | Bohen et al. |
| 7,950,512 B2 | 5/2011 | Folk et al. |
| 7,954,699 B1 | 6/2011 | Sanders et al. |
| 8,011,581 B1 | 9/2011 | Folk et al. |
| 8,019,663 B1 | 9/2011 | Bohen et al. |
| 8,025,214 B1 | 9/2011 | Folk et al. |
| 8,032,415 B2 | 10/2011 | Sanders et al. |
| 8,047,427 B2 | 11/2011 | Sanders et al. |
| 8,056,305 B1 | 11/2011 | Folk et al. |
| 8,096,398 B2 | 1/2012 | Folk et al. |
| 8,117,127 B1 | 2/2012 | Sanders et al. |
| 8,141,772 B1 | 3/2012 | Folk et al. |
| 8,157,078 B1 | 4/2012 | Folk et al. |
| 8,172,067 B1 | 5/2012 | Folk et al. |
| 8,175,970 B1 | 5/2012 | Mon et al. |
| 8,177,132 B1 | 5/2012 | Bohen et al. |
| 8,181,854 B1 | 5/2012 | Folk et al. |
| 8,181,856 B1 | 5/2012 | Folk et al. |
| 8,196,826 B2 | 6/2012 | Folk et al. |
| 8,201,680 B1 | 6/2012 | Folk et al. |
| 8,210,429 B1 | 7/2012 | Bohen et al. |
| 8,214,257 B1 | 7/2012 | Folk et al. |
| 8,225,988 B1 | 7/2012 | Bohen et al. |
| 8,227,936 B1 | 7/2012 | Folk et al. |
| 8,260,669 B1 | 9/2012 | Folk et al. |
| 8,272,563 B1 | 9/2012 | Folk et al. |
| 8,274,364 B1 | 9/2012 | Bohen et al. |
| 8,327,995 B1 | 12/2012 | Folk et al. |
| 8,346,640 B1 | 1/2013 | Sanders et al. |
| 8,387,874 B1 | 3/2013 | Bohen et al. |
| 8,396,278 B2 | 3/2013 | Jones et al. |
| 8,401,965 B2 | 3/2013 | Johnson et al. |
| 8,407,119 B2 | 3/2013 | Folk et al. |
| 8,430,303 B1 | 4/2013 | Sanders et al. |
| 8,517,257 B1 | 8/2013 | Folk et al. |
| 8,556,166 B1 | 10/2013 | Folk et al. |
| 8,561,885 B1 | 10/2013 | Folk et al. |
| 8,571,948 B1 | 10/2013 | Nichols et al. |
| 8,600,842 B1 | 12/2013 | Sanders et al. |
| 8,601,771 B2 | 12/2013 | Folk et al. |
| 8,602,295 B1 | 12/2013 | Sanders et al. |
| 8,640,945 B1 | 2/2014 | McCormick |
| 8,781,903 B1 | 7/2014 | Bohen et al. |
| 8,812,366 B2 | 8/2014 | Folk et al. |
| 8,812,394 B1 | 8/2014 | Folk et al. |
| 8,909,547 B2 | 12/2014 | Bohen et al. |
| 8,925,797 B1 | 1/2015 | Bohen et al. |
| 9,004,352 B1 | 4/2015 | Graef et al. |
| 9,064,366 B1 | 6/2015 | Folk et al. |
| 9,070,125 B1 | 6/2015 | Folk et al. |
| 9,098,960 B1 | 8/2015 | Folk et al. |
| 9,311,671 B2 | 4/2016 | Folk et al. |
| 9,547,848 B2 | 1/2017 | Folk et al. |
| 9,697,493 B2 | 7/2017 | Folk et al. |
| 9,715,793 B1 | 7/2017 | Brancaccio |
| 10,977,889 B1* | 4/2021 | McCabe ............... G07D 11/40 |
| 11,188,910 B2 | 11/2021 | Yang |
| 11,315,379 B1 | 4/2022 | Crandall et al. |
| 11,410,149 B1 | 8/2022 | Goetz |
| 11,615,665 B1* | 3/2023 | McCabe ............... G07D 11/23 |
| | | | 235/379 |
| 11,688,221 B1 | 6/2023 | Crandall |
| 12,002,319 B1* | 6/2024 | McCabe ............... G07D 11/32 |
| 2002/0074709 A1 | 6/2002 | Kanagawa |
| 2005/0011721 A1 | 1/2005 | Armanini et al. |
| 2005/0027626 A1 | 2/2005 | Garcia |
| 2005/0289030 A1 | 12/2005 | Smith |
| 2006/0253349 A1 | 11/2006 | Brooks et al. |
| 2009/0070263 A1 | 3/2009 | Davis et al. |
| 2010/0010904 A1 | 1/2010 | Sanders |
| 2010/0131407 A1 | 5/2010 | Folk et al. |
| 2011/0060639 A1 | 3/2011 | Garcia |
| 2011/0258090 A1 | 10/2011 | Bosch et al. |
| 2012/0073482 A1 | 3/2012 | Meeker et al. |
| 2013/0191196 A1 | 7/2013 | Cecala |
| 2013/0232064 A1 | 9/2013 | Bosch |
| 2013/0346135 A1 | 12/2013 | Siemens et al. |
| 2014/0074708 A1 | 3/2014 | Bellamy |
| 2014/0279675 A1 | 9/2014 | Wiig et al. |
| 2014/0353375 A1 | 12/2014 | Turocy et al. |
| 2015/0199661 A1 | 7/2015 | Saoji et al. |
| 2017/0061561 A1 | 3/2017 | Cha |
| 2017/0193731 A1 | 7/2017 | Kim et al. |
| 2017/0232300 A1 | 8/2017 | Tran et al. |
| 2017/0286883 A1 | 10/2017 | Nail et al. |
| 2018/0005193 A1 | 1/2018 | Crandall et al. |
| 2018/0047239 A1 | 2/2018 | Niizuma |
| 2018/0078843 A1 | 3/2018 | Tran et al. |
| 2018/0144321 A1 | 5/2018 | Baar et al. |
| 2018/0181935 A1* | 6/2018 | Johnson ............... G07G 1/0009 |
| 2018/0218323 A1 | 8/2018 | Nguyen |
| 2018/0240190 A1 | 8/2018 | Schumacher |
| 2018/0293649 A1 | 10/2018 | Morgan et al. |
| 2018/0300703 A1 | 10/2018 | Hiramatsu et al. |
| 2019/0220839 A1 | 7/2019 | Oliynyk |
| 2021/0327198 A1 | 10/2021 | Yukawa |

OTHER PUBLICATIONS

U.S. Appl. No. 17/182,704, filed Feb. 23, 2021, U.S. Pat. No. 11,615,665, Issued.

U.S. Appl. No. 16/516,026, filed Jul. 18, 2019, U.S. Pat. No. 10,977,889, Issued.

United States Patent and Trademark Office, Unpublished U.S. Appl. No. 12/241,397.

United States Patent and Trademark Office, Office Action for U.S. Appl. No. 16/516,026, filed Jul. 9, 2020, (9 pages), U.S.

United States Patent and Trademark Office, NonFinal Office Action for U.S. Appl. No. 16/516,000, filed Aug. 13, 2020, (17 pages), U.S.

United States Patent and Trademark Office, NonFinal Office Action for U.S. Appl. No. 16/697,503, filed Sep. 29, 2020, (15 pages), U.S.

NonFinal Office Action for U.S. Appl. No. 16/906,056, dated Oct. 6, 2021, (16 pages), United States Patent and Trademark Office, USA.

Notice of Allowance and Fee(s) Due for U.S. Appl. No. 16/906,056, dated Apr. 27, 2022, (13 pages), United States Patent and Trademark Office, US.

NonFinal Office Action for U.S. Appl. No. 17/182,704, dated Jun. 17, 2022, (9 pages), United States Patent and Trademark Office, US.

NonFinal Office Action for U.S. Appl. No. 17/166,561, dated Oct. 14, 2022, (8 pages), United States Patent and Trademark Office, US.

Notice of Allowance and Fee(s) Due for U.S. Appl. No. 16/928,460, dated Feb. 1, 2023, (11 pages), United States Patent and Trademark Office, US.

Non-Final Office Action for United States U.S. Appl. No. 18/315,883, dated Dec. 7, 2023, (9 pages), United States Patent and Trademark Office.

Non-Final Office Action for United States U.S. Appl. No. 17/166,561, dated Dec. 28, 2023, (17 pages), United States Patent and Trademark Office.

Non-Final Office Action for United States U.S. Appl. No. 18/620,045, dated May 8, 2025, (15 pages), United States Patent and Trademark Office.

* cited by examiner

CLOUD-BASED CASH INVENTORY MANAGEMENT FOR ON-PREMISES CASH HANDLING DEVICES

This patent application is a continuation of U.S. patent application Ser. No. 18/166,659, filed Feb. 9, 2023, which is a continuation of U.S. patent application Ser. No. 17/182,704, filed Feb. 23, 2021, which is a continuation of U.S. patent application Ser. No. 16/516,026, filed on Jul. 18, 2019, which claims priority to U.S. Provisional Appl. Ser. No. 62/700,072, filed Jul. 18, 2018, all of which are incorporated herein by reference in their entirety.

BACKGROUND

Existing commercial cash management systems configured to store cash on-premises for commercial establishments operate under the premise that the commercial establishments maintain possession and complete control over the cash stored therein. Due to communication limitations between those commercial cash management systems and banking services systems, as well as security and access concerns regarding the contents of those cash management systems, banking establishments have historically been incapable and unwilling to extend existing banking services to encompass cash stored within commercial cash management systems located away from banking locations (e.g., on premises at various commercial establishment locations). Moreover, existing systems provide little transparency for monitoring the amount of cash within cash handling devices at a plurality of locations. Accordingly, there remains a need to provide additional capability and security for commercial cash management systems to provide additional transparency for monitoring cash storage and usage via a plurality of cash management devices located at a plurality of locations.

Through applied effort and ingenuity, many deficiencies of such systems have been solved by developing solutions that are in accordance with the embodiments of the present invention, many examples of which are described in detail herein.

BRIEF SUMMARY

Certain embodiments incorporate automated systems and methodologies for remotely monitoring cash reserves within a plurality of cash handling devices at multiple locations, and for nimbly initializing appropriate work flows to ensure these cash handling devices maintain optimal cash reserves at all times. Such embodiments incorporate current data indicative of current cash levels within cash handling devices, and automatically selected relevant historical data to aid in predictions of future cash usage and needs for each cash handling device. Predictions may be adjusted daily, such that change orders (to deliver or pick-up cash) are only executed when absolutely necessary to maintain optimal cash reserves within cash handling devices.

A first embodiment is directed to a system for cash handling device operation management, the system comprising one or more non-transitory memory storage areas and one or more processors collectively configured to: remotely monitor closing transaction data generated by at least one cash handling device, wherein the closing transaction data reflects physical cash movement within a corresponding cash handling device for one or more of a plurality of cash denominations during an activity period; based at least in part on data reflected within a portion of the closing transaction data, query a historical usage database to retrieve historical usage data relating to one or more forecast periods; generate usage forecast data for the one or more forecast periods for each of the one or more of the plurality of cash denominations for the corresponding cash handling device; and generate, based at least in part on the usage forecast data for the one or more forecast periods and the closing transaction data for the corresponding cash handling device, message data for transmission to one or more external systems to maintain a defined quantity of each of the plurality of cash denominations within the corresponding cash handling device.

In certain embodiments, generating message data for transmission to one or more external systems to maintain a defined quantity of each of the plurality of cash denominations within the corresponding cash handling device comprises: determining, based at least in part on the closing transaction data and the usage forecast data, a forecast quantity of each of the plurality of cash denominations within the cash handling device during each of the one or more forecast periods; comparing the forecast quantity of each of the plurality of cash denominations during each of the one or more forecast periods against the defined quantity corresponding to each of the plurality of cash denominations; and upon determining that the forecast quantity of one or more of the plurality of cash denominations of at least one of the one or more forecast periods does not satisfy the defined quantity, generate message data to initiate a cash transfer involving the corresponding cash handling device to satisfy the defined quantity of each of the plurality of cash denominations within the corresponding cash handling device.

In various embodiments, the defined quantity is generated based at least in part on the historical usage data related to the one or more forecast periods and one or more manual adjustments relating to forecast period. Moreover, generating the message data may comprise determining a cash transfer date to satisfy the defined quantity for each of the one or more forecast periods, and wherein the cash transfer date is selected based at least in part on one or more of: previously scheduled cash transfer dates, scheduled bank holidays, or cash handling device accessibility. In certain embodiments, remotely monitoring the closing transaction data comprises periodically receiving closing transaction data from each of the at least one cash handling device. Moreover, the one or more forecast periods may comprise at least one day occurring after the activity period. In certain embodiments, the one or more forecast period comprises a first forecast period and a second forecast period occurring after the first forecast period, wherein the first forecast period and the second forecast period are consecutive days. In various embodiments, determining a forecast quantity of each of the plurality of cash denominations within the cash handling device during the second forecast period comprises determining the forecast quantity of each of the plurality of cash denominations within the cash handling device based at least in part on the forecast quantity of each of the plurality of cash denominations within the cash handling device after the first forecast period and the forecast usage during the second forecast period.

A second embodiment is directed to a computer-implemented method for cash handling device operation management, the method comprising: remotely monitoring closing transaction data generated by at least one cash handling device via one or more processors, wherein the closing transaction data reflects physical cash movement within a corresponding cash handling device for one or more of a plurality of cash denominations during an activity period;

based at least in part on data reflected within a portion of the closing transaction data, querying a historical usage database via the one or more processors, to retrieve historical usage data relating to one or more forecast periods; generating, via the one or more processors, usage forecast data for the one or more forecast periods for each of the one or more of the plurality of cash denominations for the corresponding cash handling device; and generating, via the one or more processors and based at least in part on the usage forecast data for the one or more forecast periods and the closing transaction data for the corresponding cash handling device, message data for transmission to one or more external systems to maintain a defined quantity of each of the plurality of cash denominations within the corresponding cash handling device.

In certain embodiments, generating message data for transmission to one or more external systems to maintain a defined quantity of each of the plurality of cash denominations within the corresponding cash handling device comprises: determining, based at least in part on the closing transaction data and the usage forecast data, a forecast quantity of each of the plurality of cash denominations within the cash handling device during each of the one or more forecast periods; comparing the forecast quantity of each of the plurality of cash denominations during each of the one or more forecast periods against the defined quantity corresponding to each of the plurality of cash denominations; and upon determining that the forecast quantity of one or more of the plurality of cash denominations of at least one of the one or more forecast periods does not satisfy the defined quantity, generate message data to initiate a cash transfer involving the corresponding cash handling device to satisfy the defined quantity of each of the plurality of cash denominations within the corresponding cash handling device.

Moreover, the defined quantity may be generated based at least in part on the historical usage data related to the one or more forecast periods and one or more manual adjustments relating to forecast period. In certain embodiments, generating the message data comprises determining a cash transfer date to satisfy the defined quantity for each of the one or more forecast periods, and wherein the cash transfer date is selected based at least in part on one or more of: previously scheduled cash transfer dates, scheduled bank holidays, or cash handling device accessibility. In various embodiments, remotely monitoring the closing transaction data comprises periodically receiving closing transaction data from each of the at least one cash handling device. In certain embodiments, the one or more forecast periods comprise at least one day occurring after the activity period. Moreover, the one or more forecast period may comprise a first forecast period and a second forecast period occurring after the first forecast period, wherein the first forecast period and the second forecast period are consecutive days. In certain embodiments, determining a forecast quantity of each of the plurality of cash denominations within the cash handling device during the second forecast period comprises determining the forecast quantity of each of the plurality of cash denominations within the cash handling device based at least in part on the forecast quantity of each of the plurality of cash denominations within the cash handling device after the first forecast period and the forecast usage during the second forecast period.

A third embodiment is directed to a computer program product comprising a non-transitory computer readable medium having computer program instructions stored therein, the computer program instructions when executed by a processor, cause the processor to: remotely monitor closing transaction data generated by at least one cash handling device, wherein the closing transaction data reflects physical cash movement within a corresponding cash handling device for one or more of a plurality of cash denominations during an activity period; based at least in part on data reflected within a portion of the closing transaction data, query a historical usage database to retrieve historical usage data relating to one or more forecast periods; generate usage forecast data for the one or more forecast periods for each of the one or more of the plurality of cash denominations for the corresponding cash handling device; and generate, based at least in part on the usage forecast data for the one or more forecast periods and the closing transaction data for the corresponding cash handling device, message data for transmission to one or more external systems to maintain a defined quantity of each of the plurality of cash denominations within the corresponding cash handling device.

In certain embodiments, generating message data for transmission to one or more external systems to maintain a defined quantity of each of the plurality of cash denominations within the corresponding cash handling device comprises: determining, based at least in part on the closing transaction data and the usage forecast data, a forecast quantity of each of the plurality of cash denominations within the cash handling device during each of the one or more forecast periods; comparing the forecast quantity of each of the plurality of cash denominations during each of the one or more forecast periods against the defined quantity corresponding to each of the plurality of cash denominations; and upon determining that the forecast quantity of one or more of the plurality of cash denominations of at least one of the one or more forecast periods does not satisfy the defined quantity, generate message data to initiate a cash transfer involving the corresponding cash handling device to satisfy the defined quantity of each of the plurality of cash denominations within the corresponding cash handling device.

In various embodiments, the defined quantity is generated based at least in part on the historical usage data related to the one or more forecast periods and one or more manual adjustments relating to forecast period. Moreover, generating the message data may comprise determining a cash transfer date to satisfy the defined quantity for each of the one or more forecast periods, and wherein the cash transfer date is selected based at least in part on one or more of: previously scheduled cash transfer dates, scheduled bank holidays, or cash handling device accessibility. In certain embodiments, remotely monitoring the closing transaction data comprises periodically receiving closing transaction data from each of the at least one cash handling device. Moreover, the one or more forecast periods may comprise at least one day occurring after the activity period. In certain embodiments, the one or more forecast period comprises a first forecast period and a second forecast period occurring after the first forecast period, wherein the first forecast period and the second forecast period are consecutive days. In various embodiments, determining a forecast quantity of each of the plurality of cash denominations within the cash handling device during the second forecast period comprises determining the forecast quantity of each of the plurality of cash denominations within the cash handling device based at least in part on the forecast quantity of each of the plurality of cash denominations within the cash handling device after the first forecast period and the forecast usage during the second forecast period.

A fourth embodiment is directed to a system for cash handling device operation management, the system comprising one or more non-transitory memory storage areas and one or more processors collectively configured to: generate, via the one or more processors, an auto order record for a cash handling device; populate a portion of the auto order record with end-of-day transaction data received from the cash handling device; trigger a forecasting task for the cash handling device, the forecasting task comprising: generate an operating fund for a forecast period; determine a forecast starting content of the cash handling device for the forecast period; and upon determining the forecast starting content does not satisfy the operating fund for the forecast period, initialize a cash transfer to the cash handling device by transmitting the auto order record to an external computing entity.

In various embodiments, generating an operating fund for the forecast period comprises: retrieving historical usage data relevant to the forecast period; and generating the operating fund based at least in part on one or more of the historical usage data or manual adjustments. In certain embodiments, determining a forecast starting content of the cash handling device for the forecast period comprises: retrieving an end-of-day content from the end-of-day transaction data record. Moreover, the forecast period may be embodied as a first forecast period of a plurality of forecast periods, and wherein the plurality of forecast periods comprise the first forecast period and a second forecast period occurring consecutively after the first forecast period; and wherein the forecasting task additionally comprises determining a second forecast starting content for the second forecast period by: determining a forecast end-of-day content after the first forecast period based at least in part on one or more of: the end-of-day transaction data and historical data relevant to the first forecast period. In certain embodiments, the one or more processors execute the forecasting task for each of a plurality of cash denominations.

BRIEF DESCRIPTION OF THE SEVERAL VIEWS OF THE DRAWINGS

Reference will now be made to the accompanying drawings, which are not necessarily drawn to scale, and wherein:

Figure 9:
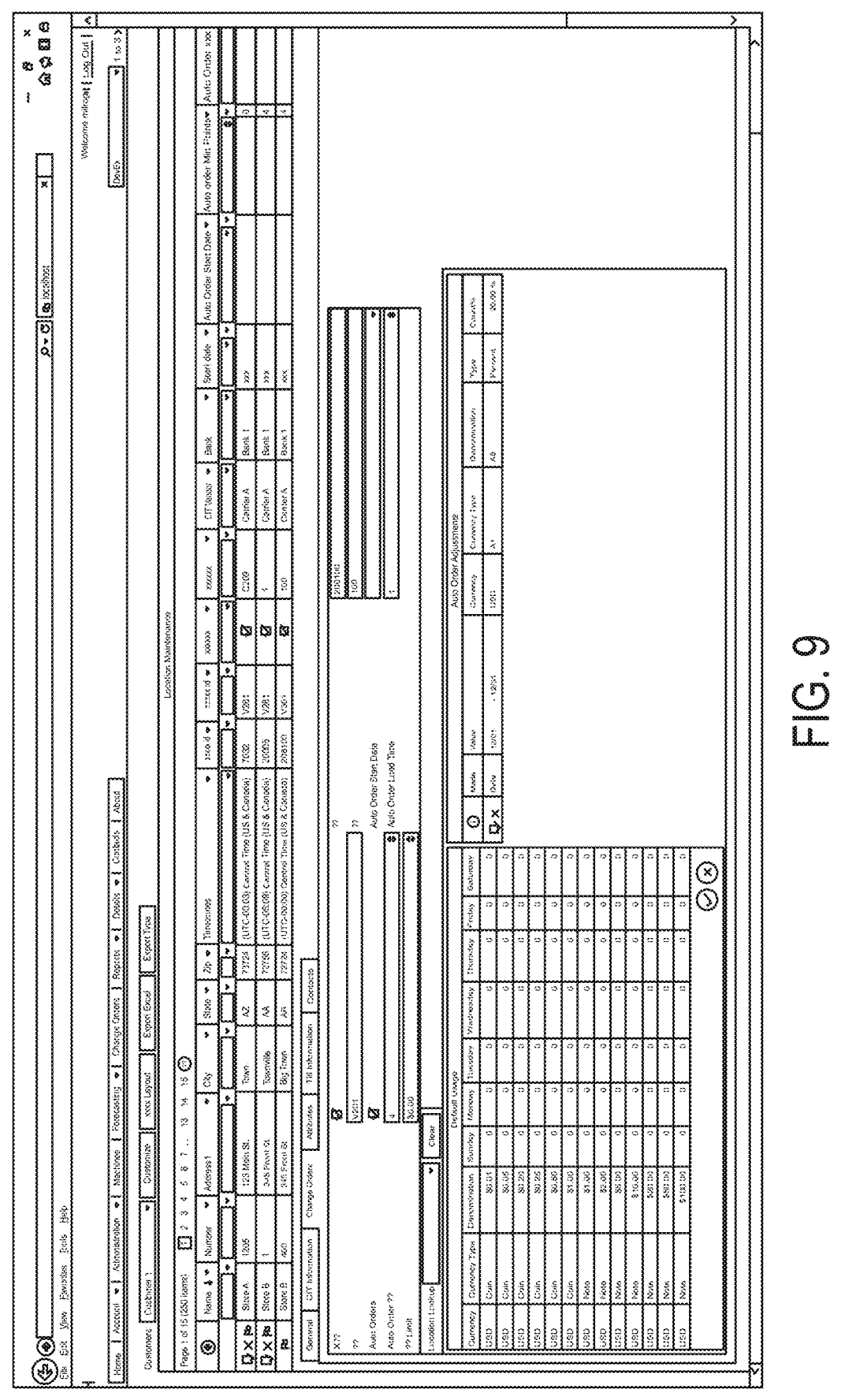
Figure 10:
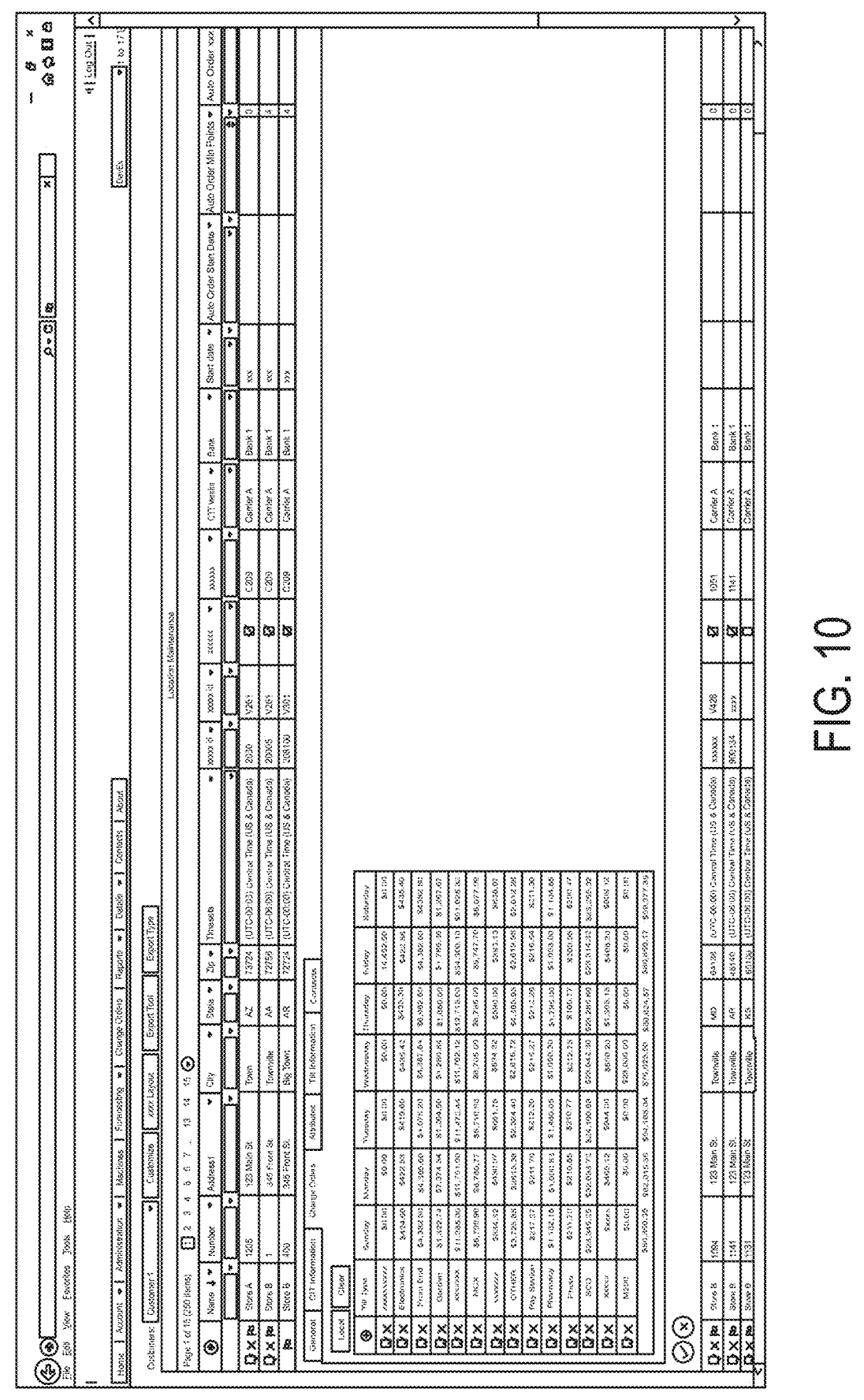

FIGS. 8-13 illustrate example user interfaces that may be generated and provided to a user according to various embodiments.

DETAILED DESCRIPTION

Figure 1:
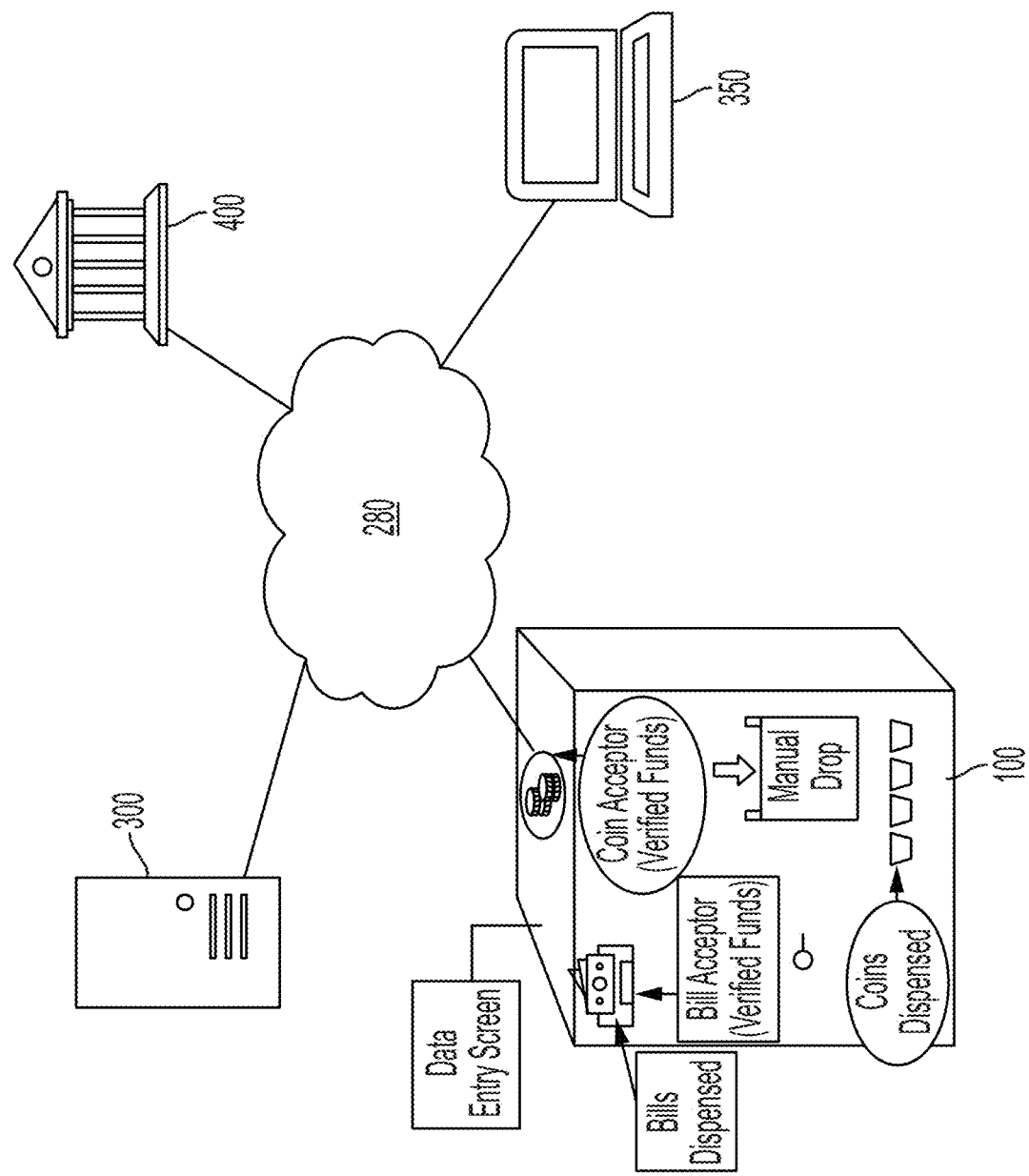
FIG. 1 illustrates a network environment in which data may be transferred regarding the functionality of a cash handling device according to certain embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Definitions

As referenced herein, a financial institution may encompass traditional banking or other financial institutions (e.g., a bank, credit union, commercial banking establishment, and/or the like); non-traditional financial institutions (e.g., financial-technology entities, computer-based financial institutions, and/or the like); or combinations thereof (e.g., a traditional financial institution utilizing various products, services, and/or the like of a third party entity, for example, for executing back-end computing systems of the financial institution), with which a commercial customer has one or more accounts (e.g., commercial checking accounts). Financial institutions may credit a customer's account based on physical cash received (e.g., at a bank branch location) and/or electronic cash deposits received at the financial institution on behalf of the customer. These credits may be hard credits-enabling the customer to withdraw against the deposited amount, or provisional credits, indicating that the customer's account reflects a recent or pending deposit, but the amount is not yet available for withdrawing against the credit. Provisional credits may be converted to hard credits upon the occurrence of various trigger events (e.g., verification of the amount of the deposit, occurrence of various events necessary to comply with applicable federal rules/regulations/laws, and/or the like). Financial institutions may each have one or more physical banking locations, such as banking branches accessible to individuals wishing to make withdrawals and/or deposits. These banking locations may encompass cash storage areas (e.g., vaults) from which various change orders may be provided, and where physical cash involved in a cash deposit may be stored.

A customer (or commercial customer, as the terms are utilized herein) may be embodied as a commercial establishment having an account with a financial institution and/or other institutions. The commercial customer may be a retail establishment (e.g., a purveyor of goods), a services provider, and/or the like. Commercial customers may have one or more physical locations, such as brick-and-mortar locations where physical transactions with end-users may be consummated, however certain commercial customers may not have a specific physical location (e.g., service-providers providing services at various locations). As a result, commercial customers may receive physical cash at one or more of these physical locations that may be ultimately deposited to an account held with a financial institution.

Cash handling devices as discussed herein are configured for securely handling cash (and/or other forms of currency, such as coins, negotiable instruments (e.g., checks), electronic payments and/or electronic forms of currency, and/or the like), and may be configured for preventing unauthorized access to cash stored therein. Cash handling devices may be located at a customer's physical location (e.g., within a customer's brick-and-mortar establishment), at financial institution locations, or at other locations (e.g., in publiclyaccessible areas), and may be configured for handling cash on behalf of a single customer or a plurality of customers. In either instance, a cash handling device may be configured for storing cash associated with one or more grouping identifiers associated with each customer, and these grouping identifiers may correspond with one or more accounts held at a financial institution on behalf of a customer. Cash handling devices encompass deposit-only cash handling devices (e.g., configured to accept cash therein, but not to output cash except during removal of cash from the device for transfer to a financial institution), or recycler cash handling devices (e.g., configured to accept cash therein and/or to output cash during normal operation). Cash handling devices according to certain embodiments encompass deposit-only portions (e.g., deposit cassettes configured for accepting cash therein without enabling outputs therefrom during normal operation) and recycler portions (e.g., recycler cassettes configured for accepting cash and outputting cash during normal operation), and the cash handling devices may be configured for moving cash from the recycler portion to the deposit portions. Cash handling devices may be unnetworked cash handling devices (e.g., mechanical safes) or networked cash handling devices (e.g., encompassing onboard electronic controllers in electronic communication with a plurality of electromechanical components (e.g., cash counters, cash handlers, optical sensors, and/or the like) and in electronic communication with other devices via a network). Additional functionality and features of cash handling devices are described in greater detail herein.

Physical cash may be added to or removed from a cash handling device during a change order process in which cash is transported between the cash handling device and a financial institution (e.g., to complete a deposit of cash into a banking account held at the financial institution and/or to replenish cash within a recycler cassette of a cash handling device for later output for a particular customer). The change order process may thus encompass a replenishment process in which cash is added to the cash handling device and/or a removal process in which cash is removed from the cash handling device to be transported to a financial institution. Various portions of a change order process may be performed by one or more entities. For example, replenishment processes may be performed by users (representatives of a customer), carrier employees, and/or the like. Removal processes may likewise be performed by carrier employees to transport the removed cash to an appropriate financial institution.

Customers may be associated with one or more users-individuals who may interact with cash handling devices on behalf of a particular customer. Users may be employees, representatives, owners, contractors, or any other individual who may interact with others on behalf of a particular customer. Users may have different roles and/or responsibilities when representing a particular customer, and accordingly users may have different access privileges for interactions with a cash handling device. User access may thus be limited to certain accounts associated with a customer, and/or for certain functions on behalf of a customer. Thus, certain users may have deposit-only account access at cash handling devices, or customers may have deposit and withdrawal access at cash handling devices.

A management system as discussed herein may be a centralized or distributed computing system comprising one or more computing modules in communication with a plurality of networked cash handling devices, a plurality of other computing entities (e.g., user computing entities), a plurality of financial institution computing entities, a plurality of commercial customers' computing entities, and/or the like, via a network (e.g., the internet). The management system may be configured for executing one or more software programs configured for providing cash management services as discussed in greater detail herein. These cash handling services may result in the generation of data stored via databases accessible to or embodied within the management system, and such data may be accessible to users (e.g., via user computing entities in communication over a network with the management system, for example, through one or more portals). Moreover, the management system may be configured for providing data to one or more financial institution computing entities (e.g., by providing data generated at the management system and/or passed through the management system from one or more networked cash handling devices and/or user computing entities) to enable further data usage and/or manipulation by computing entities at the financial institution (e.g., to enable providing credit (e.g., provisional credit) to customer accounts).

Data stored and/or generated at the management system may be accessible to user computing entities via a portal enabling communication between user computing entities and the management system. The portal may comprise a device-based software application or a web-application (e.g., accessible via a browser application on a user computing entity) configured for providing data to a user via a generated user interface. The portal may be configured to provide data to the user and/or to receive user input via the user interface, and may be configured to communicate data with the cloud-based computing entity via a network and corresponding interface programs (e.g., Application Program Interfaces (APIs)) enabling data exchange between the portal and the management system. Thus, for example, the user interface may provide data indicative of various cash management services provided for a customer to a user via the user interface. Moreover, the user interface may be configured to receive user input providing additional data (e.g., data indicative of the contents of an unnetworked cash handling device; data requesting initiation of a change order, and/or the like) and to relay that data to the management system via an API. The management system may then update relevant data based on the data received from the portal.

In certain embodiments, one or more computing entities (e.g., the management server and/or a cash handling device controller) is configured to store a location profile indicative of data corresponding to a particular cash handling device. The location profile may comprise identifying data, such as a location name (e.g., which may correspond to the name of a retailer in which the cash handling device is located), a location's address (e.g., 123 Main St. Atlanta, GA 30309), indoor location data (e.g., manager's office), and/or the like. Moreover, the location profile may comprise access data indicative of when the cash handling device may be accessed (e.g., normal business hours of the retail establishment, exceptions, such as holidays or specific hours during which change orders cannot be executed at the location (e.g., known high-customer-traffic hours)). The location profile may additionally comprise data indicative of characteristics of the cash handling device (e.g., recycler capabilities, such as whether the cash handling device is capable of recycling coins or just notes; recycler and/or deposit cassette capacity; and/or the like). The location profile may additionally comprise data indicative of location-specific preferences regarding the management of the cash handling device (e.g., preferences on manually-specified adjustments to an operating fund). Such location-specific preferences may be permanent (e.g., applicable until removed/changed) or temporary (e.g., applicable for a given period of time). Moreover, the location profile may comprise data indicative of the number of tills serviced by a particular location (if applicable). Where a plurality of tills are serviced by a particular cash handling device, the location profile may comprise identifying data indicative of those tills, such as till names, till descriptions (e.g., indicative of a location within a retail establishment where the till is used), and/or the like. Such till-specific data may additionally be utilized to store data indicative of the amount of cash utilized by a particular till (e.g., based on data retrieved from the cash handling device indicative of the amount of cash counted in association with a deposit or withdrawal made for a particular till).

The location profile may additionally comprise data indicative of one or more customers serviced by the cash handling device. In certain embodiments, data indicative of customers serviced by the cash handling device may be configured to provide a link between the location profile and one or more customer profiles, which may provide additional data indicative of the operation of cash handling device.

In certain embodiments, the location profile may be configured to store transitory data regarding the location. For example, the location profile may store data indicative of upcoming change orders scheduled for the location, data indicative of current contents of the location, forecast data for the location, and/or the like. In certain embodiments, the data indicative of the current contents of the location may be specified at a denominational level, and may be specified based on the location of the currency within the cash handling device. For example, data indicative of the current contents of the cash handling device may specify the number of $20 bills within a recycler, the number of $20 bills in a deposit cassette, the number of $10 bills within a recycler, the number of $10 bills in a deposit cassette, and/or the like. The data indicative of the current contents of the cash handling device may additionally specify a customer associated with the contents of the cash handling device (particularly in the case of multi-customer cash handling devices). For example, the location profile may comprise data indicative of cash associated with a first customer (e.g., on a denominational level and/or specifying the location of the cash within the cash handling device), and data indicative of cash associated with a second customer (e.g., on a denominational level and/or specifying the location of the cash within the cash handling device).

The location profile may additionally store data indicative of a financial institution servicing the cash handling device and/or one or more carriers that may deliver cash to the cash handling device. Such data may additionally indicate one or more electronic communication methodologies that may be utilized for transmitting data to the one or more financial institutions and/or carriers. For example, the location profile may store data indicative of a URL that may be utilized to access a data exchange interface (e.g., an application program interface (API)), and/or other contact information (e.g., a phone number, email address, social media contact data, mailing address, and/or the like). The location profile may additionally comprise verification data, such as a sign-on token, a public key or private key, and/or the like that may be utilized to exchange encrypted data with applicable computing entities.

It should be understood that the location profile may be stored in a memory storage area (e.g., a database) accessible to the management server or the cash handling device controller. In the latter embodiments, the management server may be configured to retrieve data of the location profile from the cash handling device controller as needed.

In various embodiments, one or more computing entities (e.g., the management server) may be configured to store one or more customer profiles each corresponding to a single customer, as discussed herein. The customer profiles may each comprise identifying information corresponding to the customer (e.g., a customer name, customer contact data, such as a phone number, email address, mailing address, social media contact data, and/or the like). The customer profiles may additionally comprise data indicative of one or more locations corresponding to the customer. It should be understood that a single customer profile may identify only one location (e.g., a single cash handling device located at the customer's single retail establishment) or a plurality of locations (e.g., a plurality of cash handling devices each located at a location of the customer's one or more locations). As a specific example, a single customer may have a plurality of retail establishments (e.g., a plurality of chain locations), and each of those retail establishments may have an associated cash handling device. Accordingly, the customer profile may identify each of the customer's locations having a cash handling device, such that the customer's preferences may be applied to all of the associated cash handling devices.

As implied, the customer profiles may each comprise data indicative of the customer's general preferences for management of cash handling devices. The customer's preferences may comprise data indicative of manual adjustments to the daily operating fund (e.g., permanent manual adjustments that are applicable until removed/changed or temporary manual adjustments that are applicable for a defined period of time). The customer's preferences may comprise data indicative of hours for accessing cash handling devices at one or more locations (e.g., exceptions indicating hours when a cash handling device cannot be accessed; operating hours of various customer locations during which cash handling devices may be accessed; and/or the like). The customer profiles may additionally comprise data indicative of one or more financial institutions and/or carriers that may be utilized for change orders for one or more locations associated with a particular customer. In certain embodiments, the customer profiles may additionally comprise data indicative of customer accounts with a financial institution (e.g., an identifier that may be utilized by a financial institution to retrieve data relating to the customer's financial institution accounts). It should be understood that the data indicative of the customer accounts with the financial institution need not comprise data that would allow an unauthorized user to access the customer's accounts with the financial institution.

The customer profile data may be stored in a memory storage area (e.g., a database) accessible to the management server, thereby enabling the management server to apply data from the customer profile to a plurality of cash handling devices. As discussed herein, the customer profile comprises data identifying the one or more locations to which the customer profile applies. Thus, the management server is configured to retrieve applicable data from the customer profile when determining whether automatically generated change orders are needed for a particular location.

Overview

Cash handling devices, including deposit-only cash handling devices and recycling cash handling devices (enabling both deposit and withdrawal functionalities), according to various embodiments may be located away from banking institution locations (such as at the location of a particular retailer or group of geographically proximate retailers) and may still provide adequate data regarding transactions occurring at the cash handling device so as to enable a banking institution to perform account-specific transactions for banking accounts associated with the commercial customers. Such cash handling devices need not be directly operated via a specific banking institution's financial management software, which enables the cash handling devices to provide data to a plurality of discrete banking institutions according to various embodiments.

The cash handling device itself comprises deposit verification mechanisms configured to count the amount and denomination of currency, negotiable instruments (e.g., checks), and/or the like deposited into the machine with a high degree of accuracy, thereby enabling the cash handling device to self-monitor the amount of currency contained therein, as well as the quantity of each of a plurality of cash denominations contained therein. Data indicative of the content of the cash handling device may be transmitted to a cloud-based management server configured to monitor the content of the cash handling device, to provide data to one or more banking institutions to provide credit to an appropriate commercial customer's account based on funds deposited into the cash handling device, to transfer funds between accounts established at one or more banking institutions, to automatically generate change orders to refill and/or empty the cash handling device, and/or the like. In certain embodiments, the cloud-based management server is configured to receive and incorporate data received from additional data sources, such as one or more user computing entities (e.g., operating portal application enabling a user to manually enter data to be provided to the management server), and may utilize the additional data as a replacement for one or more portions of data otherwise provided from a cash handling device, thereby enabling the management server to provide various calculations based on data received from the additional data sources in combination with data received from one or more cash handling devices.

Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution). The terms software, computer program product, and similar words may be used herein interchangeably.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media/memory).

In one embodiment, a non-volatile computer-readable storage medium may include a floppy disk, flexible disk, hard disk, solid-state storage (SSS) (e.g., a solid state drive (SSD), solid state card (SSC), or solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-recordable (CD-R), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an illustration of an exemplary embodiment of the present invention. As shown in FIG. 1, this particular embodiment may include one or more management systems 300, one or more mobile devices 350, one or more cash handling devices 100 as discussed herein, one or more networks 280 enabling communication among computing devices and a financial institution 400 (e.g., a financial institution server system), and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Management System

Figure 2A:
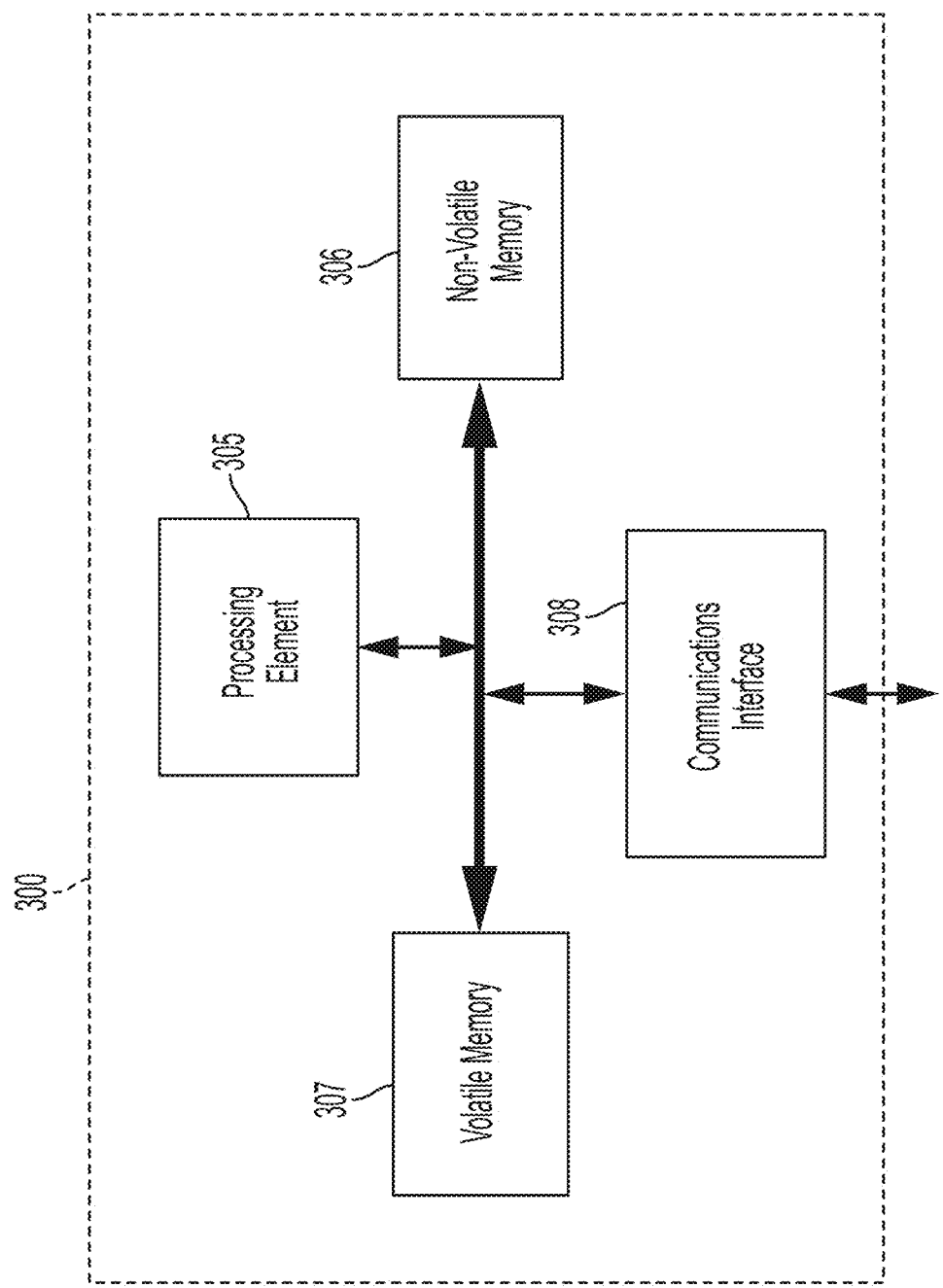
FIG. 2A schematically illustrates features of a management server according to certain embodiments.

FIG. 2A provides a schematic of a management system 300 according to one embodiment of the present invention. In one embodiment, the management system 300 may be in network communication with one or more cash handling devices 100 for monitoring transactions occurring in association with those cash handling devices 100, one or more financial institutions 400 to transmit transaction data to appropriate financial institutions 400 and/or one or more mobile devices 350 to provide various summary data thereto. In certain embodiments, the management system 300 may be operable in association with other computing devices and/or platforms (e.g., operable via third parties, such as financial institutions' online banking platforms) to accomplish certain functions (e.g., user authentication) to retrieve certain data, and/or the like. In general, the terms computing entity, computer, entity, device, system, server, machine, and/or similar words used herein interchangeably may refer to, for example, one or more computers, computing entities, desktop computers, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, controlling, remotely controlling, dispensing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Figure 2B:
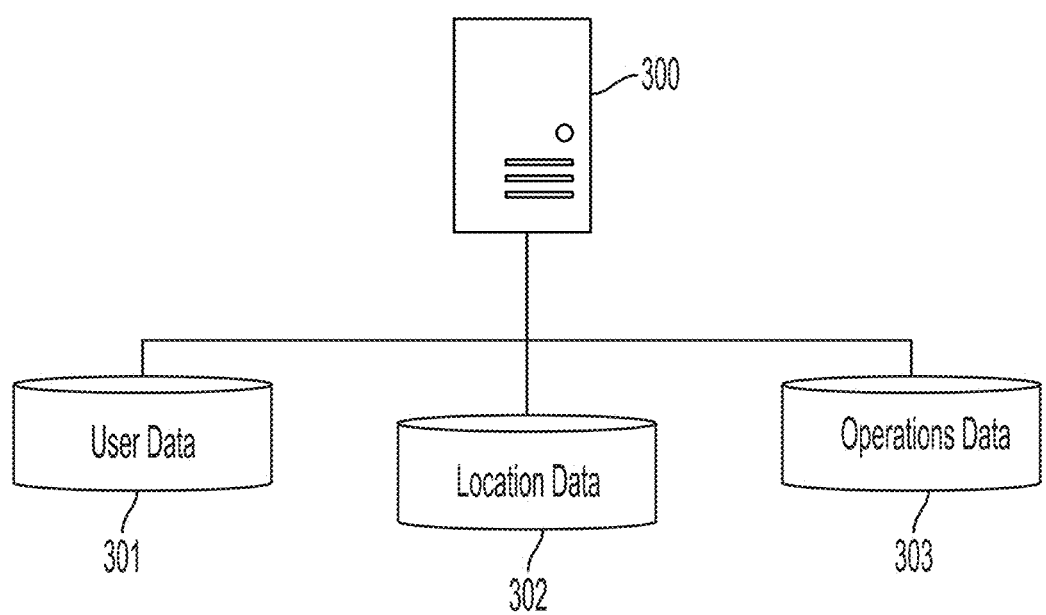
FIG. 2B schematically illustrates example data repositories associated with a management server according to certain embodiments.

As shown in FIG. 2B, the management system 300 may include or be in communication with one or more management system data repositories (e.g., user data repositories 301 storing user-specific data; location data repositories 302 storing location (e.g., cash handling device) specific data; operations data repositories 303 storing grouping profiles, machine-learning data, forecasting data, and/or the like as discussed herein; and/or the like) and/or one or more processing elements 305 (also referred to as processors, processing circuitry, processing device, and/or similar terms used herein interchangeably) that communicate with other elements within the management system 300 via a bus, for example. In certain embodiments, the management system data repositories may maintain a wide variety of data accessible to the management system 300, such as user-specific items (e.g., user (login) ID, password (or other authentication credential(s)), one or more account number (s), user name, user registration status, and/or the like). As will be understood, the processing element 305 may be embodied in a number of different ways. For example, the processing element 305 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media/memory or otherwise accessible to the processing element 305. As such, whether configured by hardware or computer program products, or by a combination thereof, the processing element 305 may be capable of performing steps or operations according to embodiments of the present invention when configured accordingly.

In one embodiment, the management system 300 may further include or be in communication with non-volatile media/memory (also referred to as non-volatile storage, memory, memory storage, memory circuitry and/or similar terms used herein interchangeably). In one embodiment, the non-volatile storage or memory may include one or more non-volatile storage or memory media 306, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the management system 300 may further include or be in communication with volatile media/memory (also referred to as volatile storage, memory, memory storage, memory circuitry and/or similar terms used herein interchangeably). In one embodiment, the volatile storage or memory may also include one or more volatile storage or memory media 307, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 305. Thus, the databases, database instances, database management systems, data, applications, programs, program modules, scripts, source code, object code, byte code, compiled code, interpreted code, machine code, executable instructions, and/or the like may be used to control certain aspects of the operation of the management system 300 with the assistance of the processing element 305 and operating system.

As indicated, in one embodiment, the management system 300 may also include one or more communications elements/interfaces 308 for communicating with various computing entities, such as by communicating data, content, information, and/or similar terms used herein interchangeably that can be transmitted, received, operated on, processed, displayed, stored, and/or the like. For instance, the management system 300 may communicate with one or more mobile devices 350, one or more cash handling devices, one or more networks 280, one or more financial institutions' computing systems, and/or the like.

As indicated, in one embodiment, the management system 300 may also include one or more communications interfaces 308 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management system 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The management system 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Although not shown, the management system 300 may include or be in communication with one or more input elements, such as a keyboard input, a mouse input, a touch screen/display input, motion input, movement input, audio input, pointing device input, joystick input, keypad input, and/or the like. In one embodiment, the management system 300 may also include or be in communication with one or more output elements (not shown), such as audio output, video output, screen/display output, motion output, movement output, and/or the like.

As will be appreciated, one or more of the management system's 300 components may be located remotely from other management system 300 components, such as in a distributed system. Furthermore, one or more of the components may be combined and additional components performing functions described herein may be included in the management system 300. Thus, the management system 300 can be adapted to accommodate a variety of needs and circumstances. As will be recognized, these architectures and descriptions are provided for exemplary purposes only and are not limiting to the various embodiments.

Exemplary Mobile Device

In one embodiment, a user may be an individual, a representative of a customer, such as a company or organization, and/or the like who wants to deposit and/or withdraw cash from a cash handling device as discussed above. The user may interact with a cash handling device via a user interface thereon, and/or the user may interact with a mobile device 350 to obtain information/data regarding one or more grouping identifiers to which the user has access. As will be recognized, a grouping identifier associated with a cash handling device may be any of a number of different account types, including a bank-owned cash account, a non-bank owned cash account, and/or the like. Accounts may be associated and/or linked with any of a variety of financial institutions holding accounts on behalf of a customer. Moreover, a grouping identifier could be associated with more than one user (e.g., a plurality of employees associated with a customer holding a grouping identifier), and each user may have different access credentials (e.g., a first user may have withdrawal and deposit access and a second user may have deposit only access to a grouping identifier). Moreover, each user may have access to a grouping identifier via different access identifiers (e.g., different user identifiers), or in certain embodiments each user may have access to the grouping identifier via an identical access number. In other embodiments, a single user identifier may be associated with more than one grouping identifier (e.g., grouping identifiers associated with a plurality of departments within a commercial customer).

Figure 3:
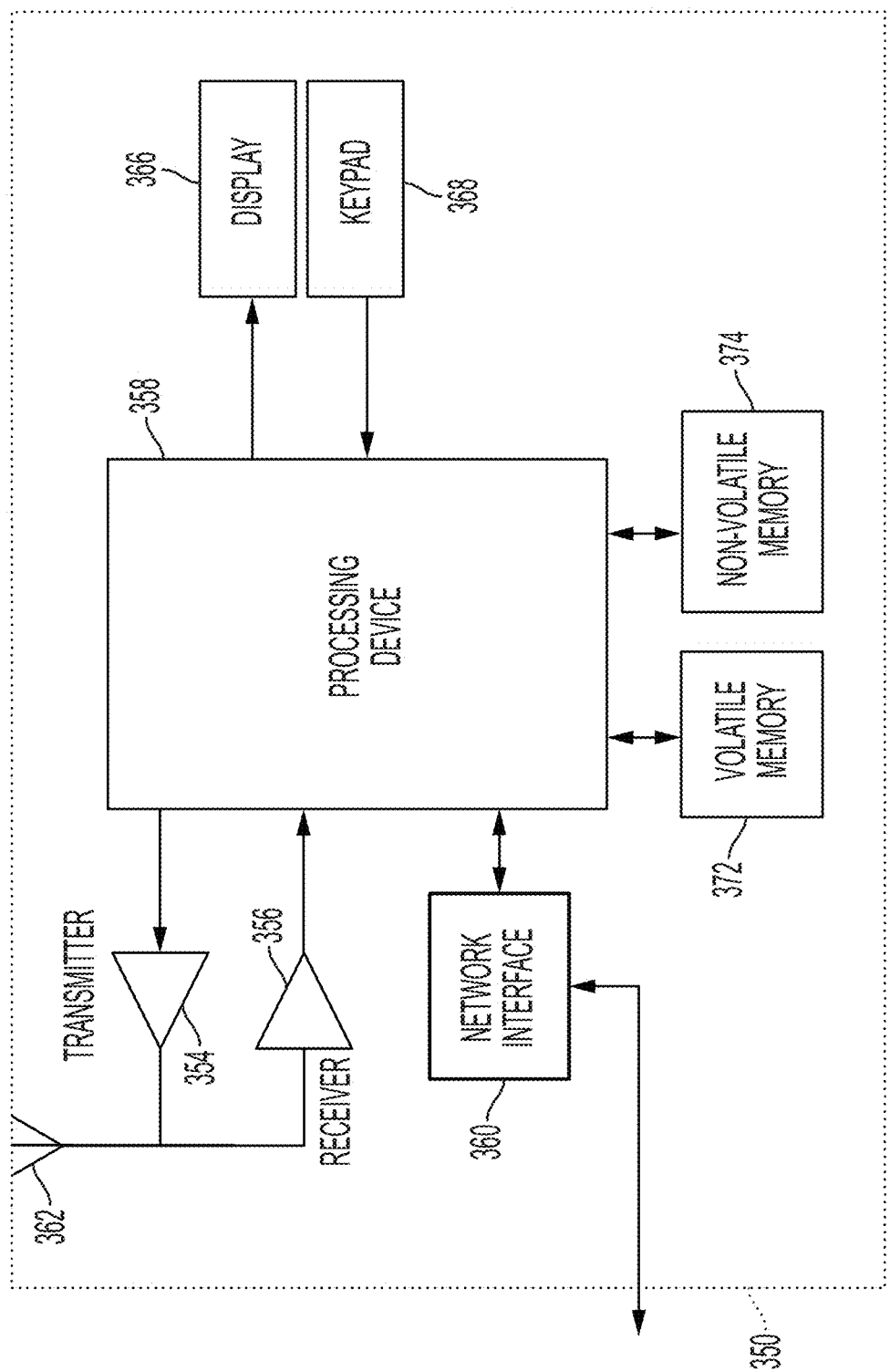
FIG. 3 schematically illustrates features of a handheld device according to certain embodiments.

The mobile device 350 includes one or more components that are functionally similar to those of the management system 300. FIG. 3 provides an illustrative schematic representative of a mobile device 350 that can be used in conjunction with embodiments of the present invention. As noted previously, the terms device, system, computing entity, entity, server, and/or similar words used herein interchangeably may refer to at least, for example, one or more computers, computing entities, mobile phones, tablets, phablets, watches, glasses, ear pieces, wristbands, wearable items/devices, the like, and/or any combination of devices or entities adapted to perform the functions, operations, and/or processes described herein. As shown in FIG. 3, the mobile device 350 can include an antenna 362, a transmitter 354 (e.g., radio), a receiver 356 (e.g., radio), and a processing element 358 (e.g., CPLDs, microprocessors, multi-core processors, cloud processors, coprocessing entities, ASIPs, microcontrollers, and/or controllers) that provides signals to and receives signals from the transmitter 354 and receiver 356, respectively.

In one embodiment, the signals provided to and received from the transmitter 354 and the receiver 356, respectively, may include signaling information/data in accordance with air interface standards of applicable wireless systems. In this regard, the mobile device 350 may be capable of operating with one or more air interface standards, communication protocols, modulation types, and access types. More particularly, the mobile device 350 may operate in accordance with any of a number of wireless communication standards and protocols, such as those described above with regard to the management system 300. In a particular embodiment, the mobile device 350 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile device 350 may operate in accordance with multiple wired communication standards and protocols, such as those described above with regard to the management system 300 via a network interface 360.

Via these communication standards and protocols, the mobile device 350 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In one embodiment, the mobile device 350 can also download changes, add-ons, and updates, for instance, to its firmware, software (e.g., including executable instructions, applications, program modules), and operating system.

According to one embodiment, the mobile device 350 may include location determining aspects, devices, modules, functionalities, and/or similar words used herein interchangeably. For example, the mobile device 350 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). In one embodiment, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the mobile device's 350 position in connection with a variety of other systems, including cellular towers, Wi-Fi access points, and/or the like. Similarly, the mobile device 350 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, Wi-Fi Direct transmitters, NFC transmitters, and/or the like. These indoor positioning aspects can be used in a variety of settings to determine the location of someone or something to within inches or centimeters.

In one embodiment, the mobile device 350 may also comprise a user interface (that can include a display 366 coupled to a processing element 358) and/or a user input interface (coupled to a processing element 358). For example, the user interface may be a user application, browser, user interface, interface, and/or similar words used herein interchangeably executing on and/or accessible via the mobile device 350 to interact with and/or cause display of information/data from the management system 300, as described herein. The user input interface can comprise any of a number of devices or interfaces allowing the mobile device 350 to receive data, such as a keypad 368 (hard or soft), a touch display, voice/speech or motion interfaces, or other input device. In embodiments including a keypad 368, the keypad 368 can include (or cause display of) the conventional numeric (0-9) and related keys (#, *), and other keys used for operating the mobile device 350 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In certain embodiments, the user interface (e.g., the display 366) may be configured for displaying access credentials that may be presented to a cash handling device 100 to enable the user to gain grouping identifier access via the cash handling device. For example, the user interface of the mobile device 350 may be utilized to display a QR code, a bar code, an image, and/or the like that is machine-readable and indicative of the user's access credentials. Similarly, the mobile device 350 may be configured for storing access credentials thereon, and transmitting those access credentials via any of a variety of wireless data transmission protocols (e.g., Bluetooth, Wi-Fi, NFC, and/or the like) to the cash handling device 100 to provide access credentials for the user to the cash handling device 100.

The mobile device 350 can also include volatile storage or memory 372 and/or non-volatile storage or memory 374, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 350. As indicated, this may include a user application that is resident on the entity or accessible through a browser or other user interface for communicating with the management system 300 and/or various other computing entities.

As will be recognized, the mobile device 350 may include one or more components or functionality that are the same or similar to those of the management system 300, as described in greater detail above. As will be recognized, these architectures and descriptions are provided for exemplary purposes only and are not limiting to the various embodiments.

Cash Handling Device Hardware

Figure 4:
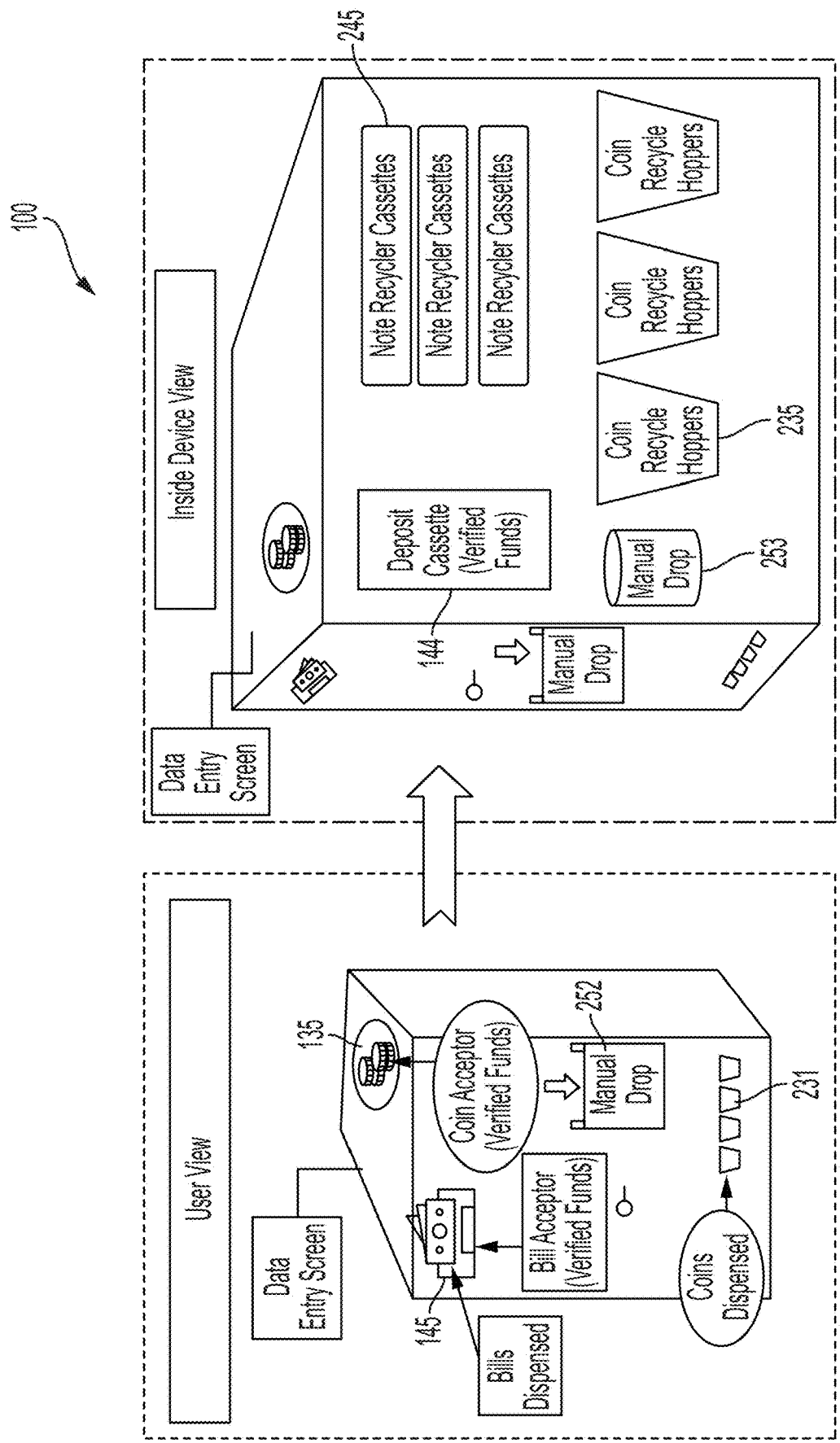
FIG. 4 schematically illustrates features of a cash handling device according to certain embodiments.

An example cash handling device 100 is shown schematically at FIG. 4. As shown therein, components of the cash handling device 100 are disposed within and/or on a housing. The cash handling device 100 may comprise a user interface (e.g., an LCD monitor, a PIN-pad, and/or the like), one or more data readers (e.g., a card reader, a barcode reader, an NFC reader, a camera (which may also be utilized for recording security footage), and/or the like), one or more currency outputs (e.g., a coin dispenser 231, such as a rolled coin dispenser or a loose coin dispenser, a note dispenser 145, such as a loose note dispenser or a bound-note dispenser, and/or the like), one or more currency and/or negotiable instrument inputs (e.g., a coin recycler 135, a check/note scanner/recycler (which may be embodied as the note dispenser 145), a deposit cassette 144, and/or the like), a receipt printer, and/or the like.

The cash handling device components collectively enable a user (e.g., a representative of a particular commercial establishment customer having an account accessible via the cash handling device 100) to deposit and/or withdraw funds from the cash handling device 100 (which may result in corresponding changes to an account balance in an account held at a particular financial institution 400 for the commercial establishment). In certain embodiments, the cash handling device 100 may enable users to withdraw currency in requested quantities and denominations (e.g., requested quantities of each of a plurality of denominations). Users may interact with the cash handling device 100 via the one or more user interface mechanisms to (1) provide user identifying data (e.g., via the one or more data readers, the PIN pad, a touch screen, and/or the like), and (2) to provide data indicative of a requested transaction to be performed with the cash handling device 100.

In certain embodiments, a plurality of users may be associated with a single account with the cash handling device 100, and each of those users may be associated with differing account access levels. For example, a first user may have deposit and withdrawal access for a particular account, while a second user may only have deposit access for the particular account. Data indicative of the access credentials for each user may be stored locally in a non-transitory memory of the cash handling device 100, on a memory within a physical identification token (e.g., a card) carried by the user, and/or the like.

With reference to FIG. 4, which illustrates a schematic view of various components of a cash handling device 100 according to one embodiment, the cash handling device 100 may comprise one or more components of a note (e.g., note) circulation system and one or more components of a coin circulation system.

In the illustrated embodiment, the note circulation system encompasses a note acceptor 145 configured for providing notes to a user and/or for accepting notes deposited by a user. The note acceptor 145 may be configured for processing a plurality of notes simultaneously (e.g., presented to the note acceptor in a stack) to speed transactions with the user. Notes passed between the note acceptor 145 and one or more note recycler cassettes 245 and/or deposit cassettes 144 (illustrated in FIG. 4) are counted, imaged, and/or otherwise verified to monitor the quantity of notes deposited/withdrawn, as well as the denomination of those notes. Through the verification mechanism of the note acceptor 145, the note circulation system may be configured to separate out negotiable instruments (e.g., checks) and/or certain notes for direction to separate storage locations, and/or to separate out and return unreadable notes and/or unreadable negotiable instruments to a user. In certain embodiments, those unreadable notes and/or unreadable negotiable instruments may be resubmitted by the user via a manual drop system 252, and the user may manually provide information regarding the denomination of the particular notes provided to the cash handling device 100 via the manual drop 253.

As is particularly relevant for deposits, the note acceptor 145 may be configured to segregate notes by denomination prior to providing those notes to a note recycler cassette 245 and/or deposit cassette 144. The segregated notes may be stored in separate storage locations (e.g., separated portions of a note recycler cassette 245 and/or separated portions of a deposit cassette 144) such that the notes may be easily recycled based on denomination for later transactions if needed. In certain embodiments, the separate storage locations may comprise separate deposit cassettes 144, separate note recycler cassettes 245, and/or separated portions of a deposit cassette 144 and/or recycler cassette 245. As a specific example utilized with U.S. currency, a cash handling device 100 may comprise two cassettes (deposit cassettes 144, note recycler cassettes 245, or both) configured for receiving and/or dispensing $1 bills, a third cassette (deposit, recycler, or both) configured for receiving and/or dispensing $5 bills, a fourth cassette (deposit, recycler, or both) configured for receiving and/or dispensing $20 bills, a fifth cassette (deposit, recycler, or both) divided into separate sections, a first section for receiving and/or dispensing $5 bills and a second section for receiving and/or dispensing $10 bills. A sixth cassette (deposit only) may be configured for receiving overflow of any denomination of note (including $1, $2, $5, $10, $20, $50, and $100) when a respective denomination-specific cassette is full and/or if no denomination specific cassette is provided for a particular note. For clarity, a cash handling device 100 may comprise deposit only cassettes having the above-referenced configuration, note recycler cassettes 245 having the above-referenced configuration (except for the deposit-only overflow cassette) or may have two sets of cassettes having the above-referenced configuration (e.g., a first set of deposit cassettes 144 having the above-referenced configuration and a second set of note recycler cassettes 245 having the above-referenced configuration, but without the overflow cassette). It should be understood that the configuration of specific denomination-specific cassettes mentioned above is presented as an example only, and any combination of denomination-specific cassettes may be utilized.

In certain embodiments, all notes received from the note acceptor 145 during deposit transactions are first directed to a note recycler cassette 245 for storage therein. Notes may be redirected from a note recycler cassette 245 to a deposit cassette 144 to remove those notes from circulation upon the occurrence of one or more trigger events, such as a quantity of notes (e.g., a quantity of a given denomination of notes) exceeding a threshold quantity or upon receipt of user input requesting that notes are moved to the deposit cassette 144. Moreover, as discussed herein, movement of notes to a deposit cassette 144 may itself be a trigger event for various tasks to be performed by the cash handling device 100 or a networked monitoring system, such as transmitting data to a financial institution 400 to direct funds into a particular account at the financial institution 400.

In certain embodiments, each time notes are moved within the cash handling device 100, the notes may pass through a quantity and/or denomination verification system to automatically monitor the amount of currency moving between the various portions of the cash handling device 100, thereby enabling the cash handling device 100 to maintain an accurate count of the amount of currency in each denomination contained therein.

With reference now to the coin circulation system, the cash handling device 100 may be comprise a coin acceptor 135 configured to accept coins deposited by a user of the cash handling device 100 (e.g., accepting rolled coins and/or loose coins). The coin acceptor 135 may have a rejection tray configured to return any unrecognizable coins deposited by the user. Moreover, the coin acceptor 135 comprises a counting and/or verification system configured for counting the quantity and denomination of coins provided via the coin acceptor 135. Coins may then be passed to one or more coin recycle hoppers 235 (e.g., which may comprise open trays, roll-creating hoppers, and/or the like) for storage within the cash handling device. In certain embodiments, those coin recycle hoppers may be configured for selectably dispensing coins as needed to fulfill a withdrawal request (e.g., as loose coins or as rolled coins). In such embodiments, the coins may be passed to one or more coin dispensing trays 231 (e.g., coin roll dispensing trays or loose coin dispensing trays) for presentation to the user.

Like the note recyclers mentioned above, the cash handling device 100 may comprise a plurality of denomination specific coin recycle hoppers 235 (and/or coin deposit hoppers) for storage of deposited coins. For example, a cash handling device 100 may comprise two coin hoppers configured for storing $0.01 coins therein, another two coin hoppers configured for storing $0.05 coins therein, a fifth coin hopper configured for storing $0.10 coins therein, sixth and seventh coin hoppers configured for storing $0.25 coins therein, and an eighth, overflow coin hopper configured for storing coins of any denomination (such as $0.01, $0.05, $0.10, $0.25, $0.50, and $1). A cash handling device 100 may comprise deposit only coin hoppers having the above configuration, coin recycler hoppers 235 having the above configuration, or both coin recycle hoppers 235 and coin deposit hoppers having the above configuration. Moreover, the configuration of denominations of coin hoppers discussed herein is provided merely as an example, any combination of denomination-specific coin hoppers may be utilized.

Moreover, the cash handling device 100 may comprise a manual drop circulation system comprising a manual drop acceptor 252 configured to accept notes and/or negotiable instruments provided by the user, and a manual drop storage cassette 253. The manual drop acceptor may operate in conjunction with the user interface, such that the manual drop may associate user-provided information regarding the quantity of a particular manual drop (e.g., value, quantity of a particular currency, and/or the like) with notes accepted via the manual drop 252. In certain embodiments, the manual drop cassette 253 may be configured to separate each collection of notes accepted via the manual drop 252, such that the user-provided information regarding the quantity of currency provided via the manual drop 252 may remain reflective of an amount of currency stored within a particular separated collection of notes. The manual drop 252 may be a deposit only system, such that notes are not recycled to users from the manual drop cassette 253.

Although not shown, the cash handling device 100 may be configured for automatically providing cash into a cashier tray (e.g., a tray to be utilized with a cash register at a Point-of-Sale (POS) terminal). In such embodiments, the cashier tray may be supported within the cash handling device 100, and the cash handling device 100 may selectably deposit quantities of notes and coins of select denominations into segmented portions of the cashier tray.

Moreover, the cash handling device 100 comprises a receipt printer configured for printing physical receipts that may be usable by individual users and/or during change order processing as discussed herein.

Cash Handling Device Controller

A cash handling device 100 having the physical configuration discussed herein may have one or more onboard computing controllers configured for performing various functions and/or for controlling the functionality of various components of the cash handling device. In one embodiment, the cash handling device controller is embodied as a computing entity that may have a configuration similar to the mobile device 350 discussed above, and which may be configured to support processing in connection with deposit and withdrawal transactions for funds via the cash handling device 100. The one or more cash handling device controllers may include computing device(s) that are local to a corresponding cash handling device 100 and/or computing device(s) that are remotely located (in certain embodiments, certain functions described in relation to the cash handling device controller may be performed by the management system 300). At least one of the cash handling device controllers may be configured to access and store information/data in at least one of one or more datastores to perform processing supported by the cash handling device 100.

Exemplary Networks

In one embodiment, any two or more of the illustrative components of the architecture of FIG. 1 may be configured to communicate with one another via respective communicative couplings to one or more networks 280. The networks 280 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 280 may have any suitable communication range associated therewith and may include, for example, global networks (e.g., the Internet), metropolitan area networks (MANs), wide area networks (WANs), local area networks (LANs), or personal area networks. In addition, the networks 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Transmissions over networks 280 may be "in the clear" or may leverage one of more of a variety of industry-standard or third-party security technologies implemented in any of the OSI layers used. If encryption is used, it may be symmetric or asymmetric (or implement a combination of the two, as in SSL/TLS, where the initial handshake uses asymmetric encryption in the exchange of symmetric keys, and subsequent transactions use symmetric encryption based on the previously exchanged symmetric keys). As will be recognized, process interaction over a network may be synchronous or asynchronous: synchronous-processes are coupled and include web services (e.g., SOAP), which may in turn leverage http(s); and various other remote procedure call (RPC), middleware protocols, industry-standard exchange formats (e.g., XML or JSON), and integration architectures (e.g., REST) and/or asynchronous-processes are decoupled and mechanisms include message queues and file transfers.

Exemplary System Operation

The management server may be configured for performing one or more operations (e.g., alone or in conjunction with a networked cash handling device). Such functionality may enable the management server to track inventory of cash at various cash handling devices and/or to forecast future cash usage and to automatically initiate change order processes to replenish or empty various cash handling devices to enable uninterrupted functionality of the cash handling device at a particular location.

Commercial establishments (e.g., retail stores) need to maintain a necessarily level of cash (by denomination) to efficiently run daily operations. Disruptions in cash supply and/or cash overfunding may have a negative financial impact on those commercial establishments. Similarly, non-optimal change order frequency for picking up cash and/or delivering new cash for the commercial establishment may have notable impacts on the commercial establishments' bottom line. To address these concerns, the management server may be configured to forecast cash usage and/or cash requirements for individual commercial establishments that may be utilized for automatic generation of appropriate change orders for cash handling devices associated with those individual commercial establishments.

The management server may additionally provide necessary information for personnel to estimate when funds within a particular cash handling device are likely to be depleted and when change orders are likely necessary to maintain necessary funding levels. This information may enable manual intervention into automated processes for tracking inventory levels and automatically initiating change orders. The management server may thus perform automatic, daily cash requirements forecasting (and cash usage estimates) for each of a plurality of locations, such that the management server may automatically initiate change orders without human intervention. However, because necessary information is provided to users, the users may intervene if necessary (e.g., in instances in which the management server cannot automatically rectify identified issues via automated systems).

Cash Inventory Tracking

Figure 5:
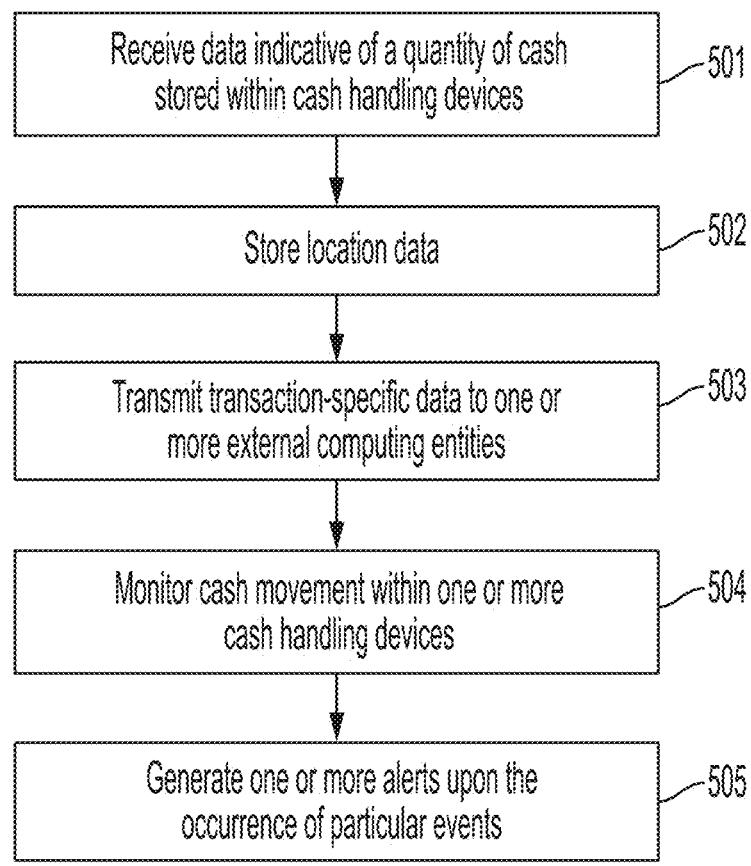
FIG. 5 is a flowchart illustrating example steps for cash inventory tracking via a management server according to various embodiments.

FIG. 5 provides a flowchart illustrating various steps performed in cash inventory tracking methodologies according to various embodiments. As indicated at Block 501, the management server 300 may be configured to periodically or continuously receive data from one or more cash handling devices 100 indicative of a quantity of cash stored in those cash handling devices 100, quantities of specific denominations of cash stored within the cash handling devices 100, transaction data indicative of cash withdrawals and/or cash deposits involving the cash handling devices 100, and/or the like. This data may be retrieved (e.g., in a data pull manner) from the cash handling devices 100 by the management server 300, or the data may be received as a result of a data push from the cash handling devices. The data may be transmitted periodically, continuously, or upon the occurrence of a trigger event (e.g., after a defined time at the end of a business day).

This data may be stored at the management server 300, as indicated at Block 502, for example, associated with a location-specific profile within a location data repository accessible to the management server 300. Data generated in association with a single transaction may be stored within a database object corresponding to (e.g., generated and corresponding to) the single transaction (which may be associated with a location profile corresponding to the cash handling device involved in the transaction). Example data stored in an example database object is summarized in Table 1, below.

TABLE 1

| Table Column | Data Type | Description |
| --- | --- | --- |
| MachineId | integer | Machine unique identifier |
| LocationId | integer | Location unique identifier |
| UsageDate | datetime | Usage Date/Time |
| Machine | Varchar(50) | Machine Name |

TABLE 1-continued

| Table Column | Data Type | Description |
| --- | --- | --- |
| Location | Varchar(250) | Location Description |
| dow | integer | Day of the week—(0-Sunday, 1-Monday, 2-Tuesday, etc.) |
| Currency | Varchar(50) | Currency (e.g., USD) |
| CurrencyType | Varchar(50) | Type of Currency |
| Denomination | Money | Cash Denomination |
| Usage | integer | Usage amount |

Moreover, the management server 300 may be configured to relay portions of data received from various cash handling devices 100 (e.g., transaction data records indicative of various transactions processed involving a particular cash handling device 100) to one or more banking institutions and/or to one or more user computing entities (e.g., operating a portal application enabling access to data stored at the management server), as shown at Block 503 of FIG. 5.

In certain embodiments, the management server 300 may be configured to monitor network connection status with a plurality of networked cash handling devices 100 to ensure accurate and updated data is successfully passed from the cash handling devices 100 to the management server 300. For example, each cash handling device 100 may be configured to provide a health signal to the management server 300 according to a defined schedule (e.g., on defined time intervals, such as every 20 minutes). If the management server 300 determines that a health signal was not received from a particular cash handling device 100 at an expected time, the management server 300 may be configured to generate and/or transmit an alert to one or more user computing entities (e.g., user computing entities associated with users having access to the unresponsive cash handling device), thereby enabling the user to check the status of the cash handling device 100.

In certain embodiments, the management server 300 may be configured to receive data from a plurality of data sources with respect to cash inventory stored at a particular cash handling device 100. For example, the cash handling device 100 may provide data indicative of aggregate inputs and outputs of cash to the machine, while a user computing device 350 may provide data indicative of how the aggregate inputs and outputs are divided among a plurality of retail tills (e.g., usable with respective POS devices). Accordingly, the management server 300 may be configured to provide till-level inventory tracking configurations based at least in part on the aggregate amount of cash input to or output from a particular cash handling device 100, as well as manually generated data provided from a user computing entity 350 indicative of how the cash was distributed from/to a various tills.

In certain embodiments, the management server 300 may be configured to receive data from a user computing entity 350 alone for tracking cash inventories at various cash handling devices 100. For example, non-networked cash handling devices 100 may not provide data indicative of the cash handling devices' contents to the management server 300, and accordingly the management server 300 may be configured for receiving inventory data regarding those cash handling devices 100 from one or more user computing entities 350 associated with users having access to the non-networked cash handling devices 100. The management server 300 may be configured for performing one or more actions utilizing the data originating from the user computing entity 350, including various cash-inventory related actions as discussed herein.

In certain embodiments, the management server 300 may be configured for management various cash movements within one or more cash handling devices 100 (as shown at Block 504), and/or to generate one or more alerts upon the occurrence of various trigger events (as shown at Block 505). These trigger events may be cash handling device specific (e.g., as defined within location profiles stored within the location data store), customer-specific (e.g., impacting all or a subset of all cash boxes associated with a particular customer and/or as defined within user data stored within a user data repository), region specific (e.g., impacting all or a subset of all cash boxes located within a particular region and/or which may be reflected within one or more location profiles stored within the location data store and/or the operations data store), and/or the like. These trigger events may, in certain embodiments, be specific to actions occurring at a single cash handling device 100, or the trigger events may encompass aggregated actions encompassing actions collectively occurring at a plurality of cash handling devices 100.

In certain embodiments, trigger events may be embodied as a detected movement of cash from a recycler cassette to a deposit cassette within a particular cash handling device 100 (e.g., a particular value of cash moved to the deposit cassette, a particular denomination of cash moved to the deposit cassette (regardless of value or above a threshold value, for example)), detection of a total value of cash within a recycler cassette or a deposit cassette satisfying a defined threshold (e.g., a lower threshold or an upper threshold) detection of a quantity of a particular denomination of currency within the recycler cassette or the deposit cassette satisfying a defined threshold (e.g., a lower threshold or an upper threshold), and/or the like. In certain embodiments, the applicable thresholds for one or more of these trigger events may be manually defined (e.g., based on user input provided via a user computing entity 350), or the applicable thresholds may be automatically defined (e.g., based on determined historical data).

Other trigger events may be embodied as an aggregate amount of cash within deposit cassettes of cash handling devices 100 associated with a particular customer, within a particular region, and/or the like (e.g., considering the total amount of cash located within deposit cassettes in a plurality of cash handling devices 100 associated with a particular customer or within a particular region), or an aggregate quantity of a particular denomination of cash being within recycler cassettes of a plurality of cash handling devices 100 associated with a customer, within a particular region, and/or the like.

To monitor the occurrence of various trigger events based on cash inventories within one or more cash handling devices 100, the management server 300 accordingly receives inventory data records indicative of the contents of a cash handling devices 100 (e.g., periodically, as a part of the health signals transmitted from the cash handling devices 100). In certain embodiments, the inventory data records comprise data indicative of the aggregate amount of cash within a cash handling device 100, denomination-specific quantities of cash within a cash handling device 100, the location of cash within the cash handling device 100 (e.g., between a recycler cassette and/or a deposit cassette), for example, on an aggregate and/or denomination-specific level, and/or the like. The inventory data records may, in certain embodiments, comprise transaction-specific data indicative of moves from one location within the cash handling device 100 to another, and/or indicative of various input and/or output transactions involving a particular cash handling device 100.

In certain embodiments, the management server may be configured to generate and/or transmit one or more alerts to a user computing entity upon detection of the occurrence of a particular trigger event. In certain embodiments, the management server may be configured for providing one or more user interfaces (e.g., one or more dashboards, one or more information providing interfaces, and/or the like, as illustrated at FIGS. 8-13) that may be displayed via a user computing entity 350 (e.g., operating a portal application). As a part of the illustrated user interfaces, the management server 300 may provide a listing of alerts generated for one or more cash handling devices 100. In certain embodiments, the management server 300 may be further configured for storing and indexing the generated alerts, thereby enabling access to and/or queries generated for historically generated alerts.

Cash Prediction and Change Order Initiation

As discussed herein, the management server 300 may be further configured to store data received from the various cash handling devices 100 and to perform various prediction and/or usage analyses of cash based at least in part on a plurality of data sets (e.g., a plurality of inventory data records) received from a particular cash handling device 100. Over time, the management server 300 is configured to develop a large set of historical data regarding cash usage involving each of a plurality of cash handling devices 100 (and/or particular accounts associated with those cash handling devices 100). The management server 300 is configured to identify usage patterns for particular denominations (e.g., via defined algorithms, via machine-learning algorithms, and/or the like), and to determine required cash reserves for use within those cash handling devices 100 and/or for daily withdrawals for commercial customers' cash usage (e.g., in a retail setting) from a particular cash handling device 100 based at least in part on historical usage data and/or one or more defined cash usage rules (e.g., a defined safety reserve level indicating the amount of additional cash that should be utilized by a particular commercial customer to handle unexpected swells in cash usage on a particular day and/or to accommodate potential late-delivery of cash during a later change over). The management server 300 may be configured to utilize a single prediction algorithm for all cash handling devices 100, or the management server 300 may be configured to identify one of a plurality of possible prediction algorithms that best suits characteristics of each cash handling device 100. In the latter embodiments, the management server 300 may be configured to change which prediction algorithm is utilized for a particular cash handling device 100 as new usage data is collected for the cash handling device 100.

As examples, the management server 300 may be configured to utilize one of a TBATS forecasting model, and ARIMA forecasting model, an AutoRegressive Integrated Moving Average (ARIMA) forecasting model, a machine-learning forecasting model, and/or the like, for forecasting cash usage at a particular cash handling device.

The management server 300 may be configured to generate usage output data to be stored within a single data object for a particular cash handling device 100. Table 2, shown below, provides examples of data that may be included within a single usage data object.

TABLE 2

| Table Column | Data Type | Description |
| --- | --- | --- |
| MachineId | integer | Machine unique identifier |
| ForecastDate | datetime | Forecast Date/Time |
| Currency | Varchar(50) | Currency |
| CurrencyType | Varchar(50) | Type of Currency |
| Denomination | Money | Cash Denomination |
| ForecastUsage | integer | Forecast usage amount |
| ProcessDate | datetime | Date when the model executed the calculation |

In certain embodiments, the management server 300 may be further configured for management cash usage at a particular cash handling device 100 and to determine appropriate change order times for replenishing cash and/or removing cash from a particular cash handling device 100. For example, the management server 300 may access or otherwise retrieve data (e.g., location data) indicative of change order availability (e.g., days on which carriers are available for processing change order requests, days on which banking institutions are available for packing change order requests, days on which particular cash handling devices are accessible within a particular retail setting (e.g., operating hours for the retail setting), holidays, and/or the like), cash reserves within a particular cash handling device 300, predicted cash usage by one or more commercial customers accessing cash within the cash handling device 100, and/or the like. Moreover, the management server 300 may store data indicative of minimum change order cash quantities (e.g., on a denominational level and/or in the aggregate), such that change orders are placed for allowable quantities of cash. For example, various banking institutions may be capable of filling change orders for bills in defined bundled quantities, for change in defined bagged quantities (or half-bag or quarter-bag quantities), and/or the like.

In certain embodiments, the management server 300 may be configured for comparing data indicative of current cash inventories (e.g., on a denominational level) of various cash handling devices 100 against automatically determined change order thresholds for determining when a particular change order is needed for a particular cash handling device 100. In certain embodiments, the automatically determined thresholds may be determined based at least in part on forecast data indicative of forecast usage of on-hand cash inventory, scheduling data indicative of when a change order may be carried out (e.g., based on carrier, banking institution, and/or cash handling device location availability), minimum and/or maximum quantities of cash that may be ordered (e.g., on a denominational level) during a change order, and/or the like.

Upon determining that a change order threshold is satisfied, the management server 300 may automatically generate a change order request data file to be transmitted to a particular carrier to carry out a change order request and/or to one or more banking institutions to request additional cash be made available to process the change order request and/or to provide data indicative of expected cash amounts to be delivered to the banking institution as a result of a particular changeover. Because the management server 300 may be in communication with a plurality of banking institutions and/or a plurality of carriers, the management server 300 may be configured to automatically determine the appropriate banking institution to provide funds for the change order and/or to determine the appropriate carrier to carry out the change order based on data associated with a particular customer associated with the cash handling device 100 for which the change order is to be processed. For example, a customer profile associated with the cash handling device 100 may comprise data indicative of a banking institution providing financial services for the customer, and a carrier providing change order processing for the cash handling device 100. Upon determining the appropriate banking institution and/or carrier to carry out a change order, the management server 300 transmits the above-referenced transaction data records to the appropriate entities to initiate the change order process.

In certain embodiments, the management server 300 may be further configured to generate an alert based on the generated transaction data records upon determining that the change order has not been carried out in an expected amount of time. For example, the management server 300 may continuously monitor data associated with a cash handling device 100 for which a change order has been ordered. Upon determining that the quantity of cash within the cash handling device 100 has not changed to reflect execution of the change order within an automatically determined time period, the management server 300 may be configured for generating and/or transmitting an alert for a user computing entity indicating the change order is late.

In certain embodiments, data stored in association with the management server 300 may be accessible via one or more user computing entities 350. Data stored in association with the management server 300, including historical data indicative of cash usage at one or more cash handling devices 100, one or more change order prediction settings, data indicative of one or more customer accounts, data indicative of one or more banking institutions connected in association with the management server 300, and/or the like may be accessible via one or more user computing entities 350. In certain embodiments, the management server 350 may be further configured for generating change order requests based at least in part on manually provided data received from one or more user computing entities 350. For example, a user computing entity 350 may provide data to the management server 300 indicative of quantities of cash provided to a cash handling device 100, removed from a cash handling device 100, and/or the like (e.g., to replicate the cash inventory reporting of networked cash handling devices for non-networked cash handling devices), such that the management server 300 may be configured for management historical cash inventories within non-networked cash handling devices 100 and/or to automatically determine when a change order should be provided for a non-networked cash handling device 100.

Accordingly, as indicated herein, the management server 300 may be configured to provide one or more user interfaces to a user (e.g., via networked user computing entities 350). The user interfaces may be configured to receive user input indicative of requested change-order overrides (e.g., to enable users to manually request a change order for a particular cash handling device), indicative of predicted increases or decreases in cash usage on a particular day (e.g., previously unscheduled sales), and/or the like.

Example Implementation

Figure 7:
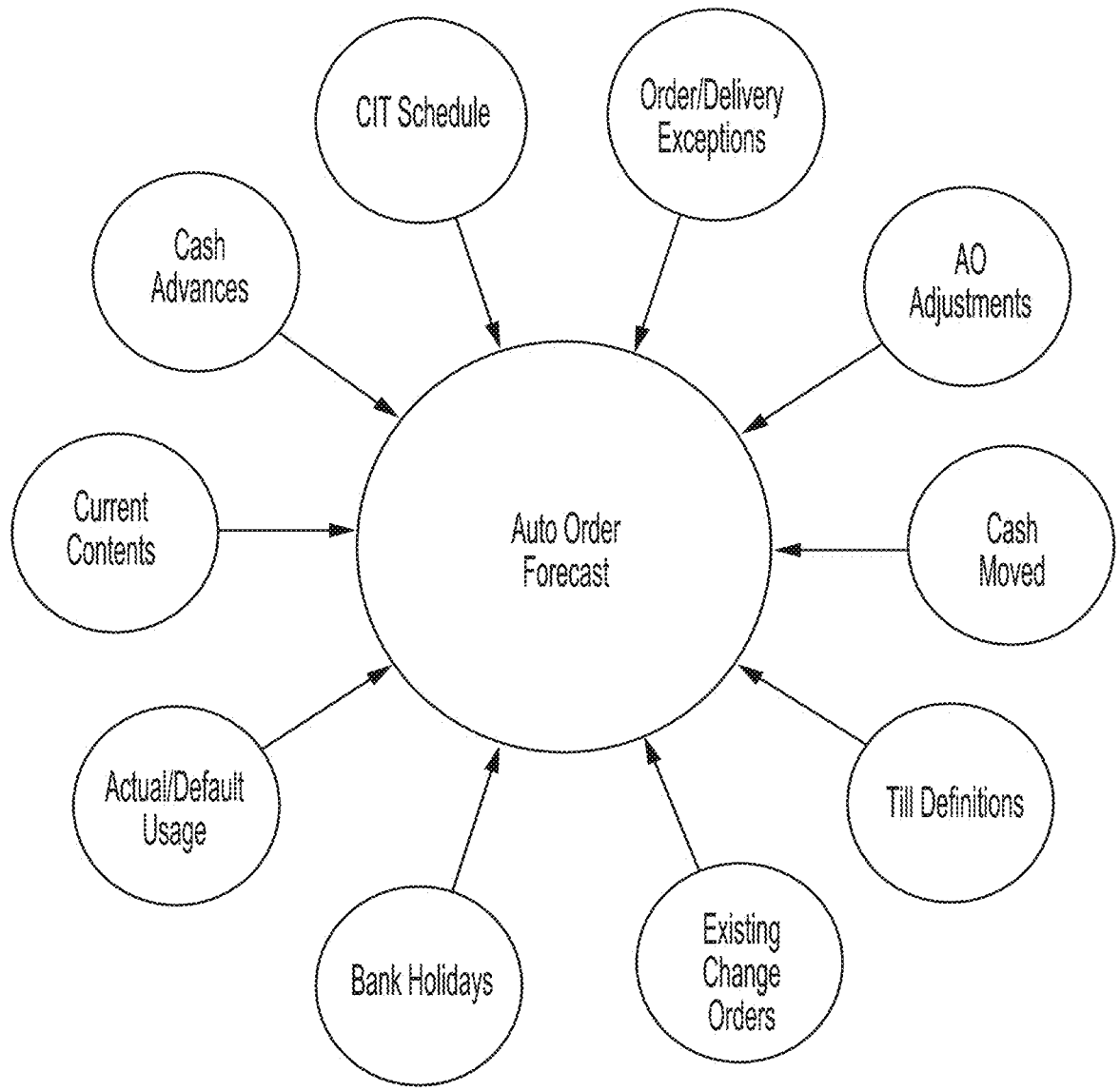
FIG. 7 illustrates example data that may be utilized for automatically scheduling a change order according to various embodiments.
Figure 11:
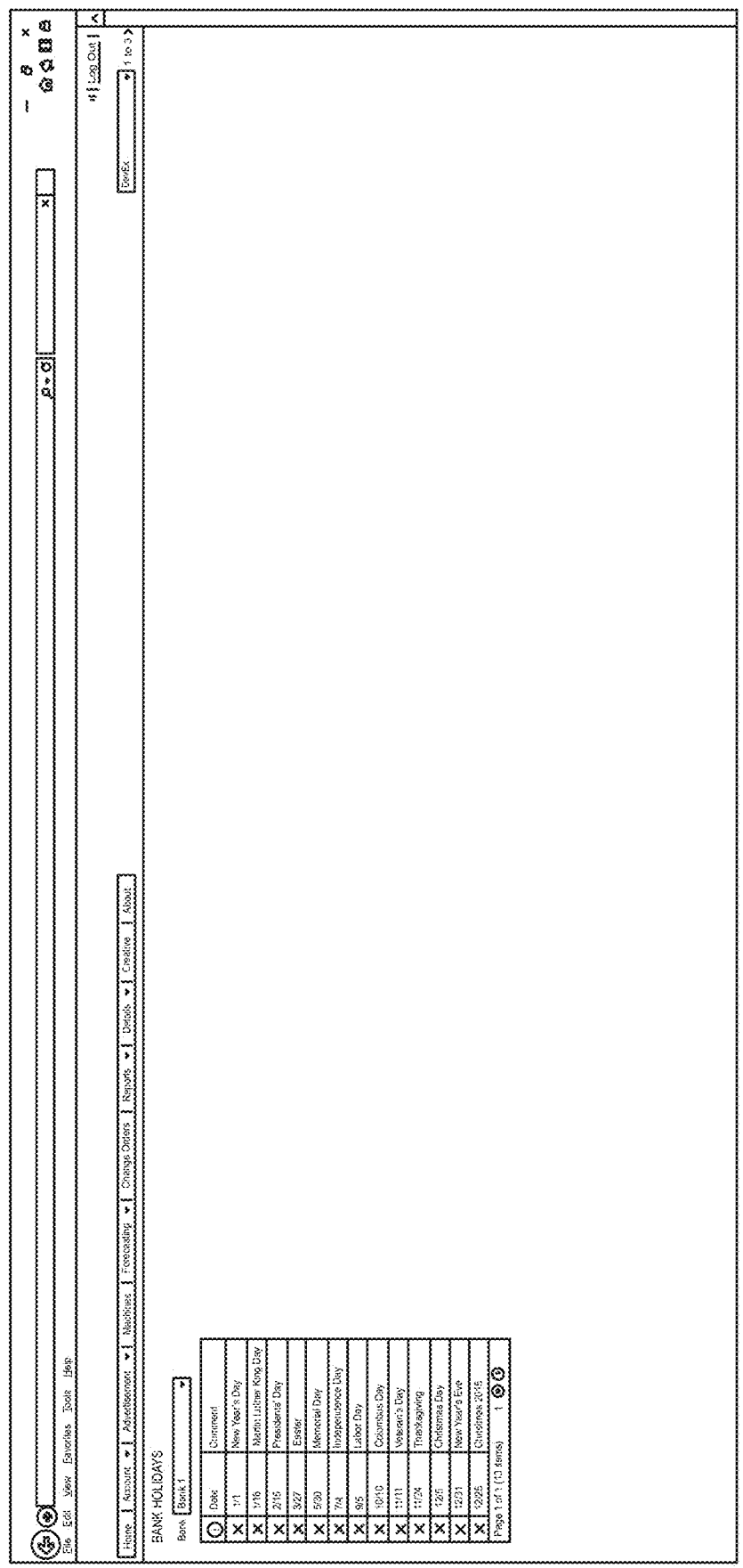

An example process for forecasting cash usage and/or automatically initiating change orders as needed is illustrated in the flowchart of FIG. 5. As shown at Block 601, the management server 300 generates an order record for each location (e.g., cash handling device 100) configured for automatic cash usage forecasting. The order record may contain data relevant for determining if and/or when a change order should be generated for the particular location. Examples of data that may be included within the order record are shown in FIG. 7, and may be retrieved from one or more data storage locations, such as customer-specific user records, location-specific data records, and/or the like. For example, the order record may comprise data indicative of a vault cutoff time for the location. The order record additionally comprises data primarily used to track cash usage at the location.

In certain embodiments, the management server 300 is configured to generate an order record for a location (as indicated at Block 601) upon detection of a trigger event. In certain embodiments, a cash handling device 100 for the location transmits an "EndDay" transaction to the management server 300. Upon receipt of the EndDay transaction, the management server 300 generates the order record for the particular location. As a part of the process for generating the order record, the management server 300 gathers information/data utilized for generating a forecast for the location. For example, as shown in FIG. 7, the gathered information/data may comprise (a) data indicative of order/delivery exceptions, (b) data indicative of manually provided adjustments (e.g., a manually specified amount extra that should remain within the cash handling device 100 above a forecast amount needed, provided via user input to a user computing entity 350), (c) data indicative of the amount of cash moved from a recycler into a deposit cassette within the cash handling device 100, (d) data indicative of till definitions (as discussed herein), (e) data indicative of existing change orders scheduled for the cash handling device 100, (f) data indicative of bank holidays, (g) data indicative of actual and/or default cash usage at the cash handling device 100, (h) data indicative of current cash contents within the cash handling device 100, (i) data indicative of cash advances made to the cash handling device 100, (j) data indicative of when cash-in-transit is scheduled to arrive, and/or the like. It should be understood that such data may be received from the cash handling device 100 itself, from a financial institution computing entity, and/or from one or more third party computing systems (e.g., computing systems of a third party carrier).

Figure 8:
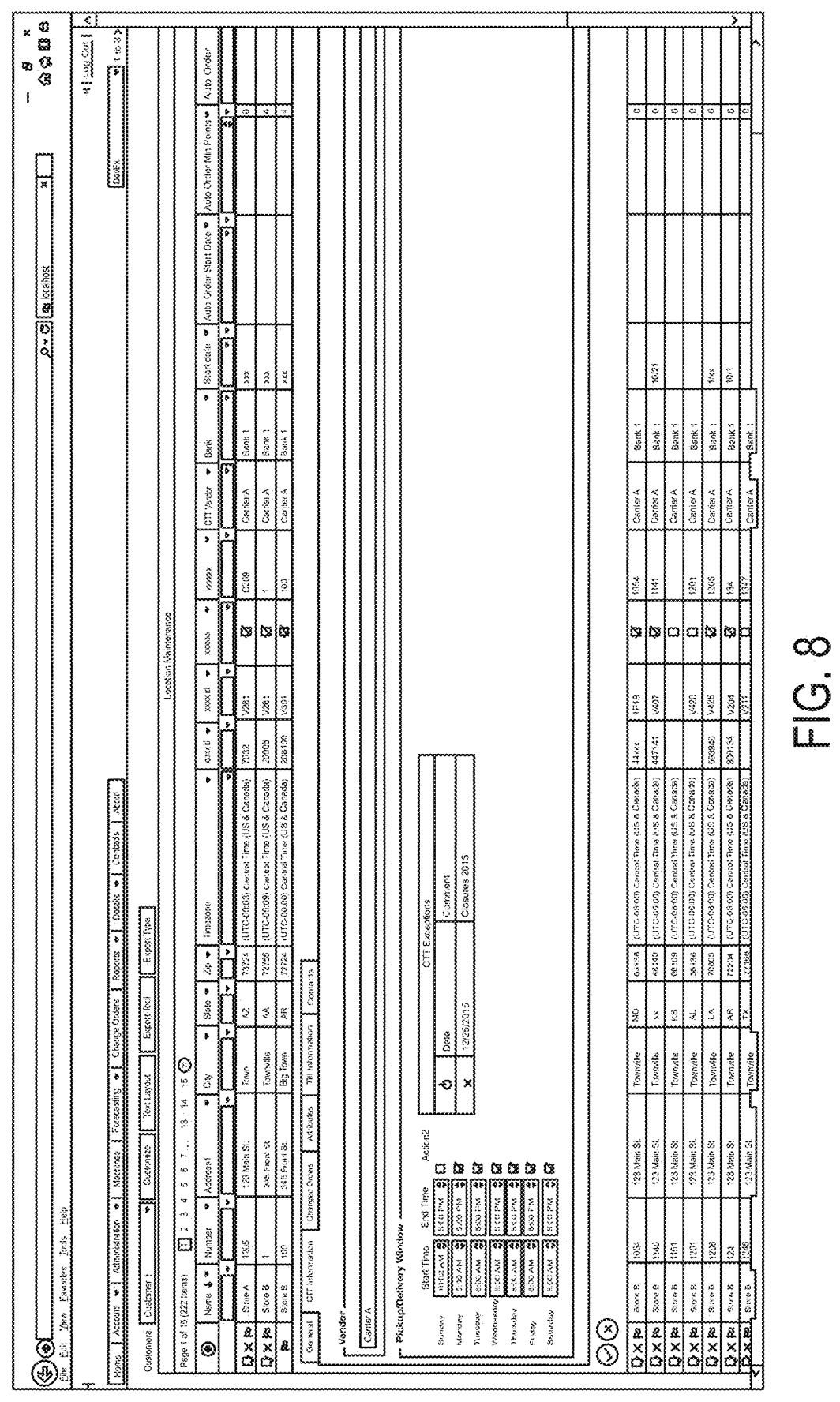

In certain embodiments, data indicative of order/delivery exceptions may be contained within customer profiles (e.g., specific to one or more customers) and/or location profiles (e.g., specific to one or more customers). The order/delivery exceptions define dates and/or times during which change orders cannot take place at a particular location, or on behalf of a particular customer. For example, the order/delivery exceptions data may define holidays specific to a particular location during which change orders cannot take place at a particular location (e.g., non-banking holidays), or times during which a cash handling device 100 at the location is inaccessible (e.g., due to the related business being closed and locked). In certain embodiments, customer profiles may be applicable to multiple locations (e.g., multiple cash handling devices 100), and accordingly order/delivery exceptions defined for a particular customer profile may be applicable to a plurality of cash handling devices 100. By contrast, order/delivery exceptions defined for a particular location (e.g., a single cash handling device 100) may be applicable to only a single cash handling device 100. It should be understood that order/delivery exception data may not be necessary and/or provided for one or more locations. In such instances, the change orders may be processable on any day not otherwise indicated as unavailable for processing (e.g., due to banking holidays, carrier delivery holidays, and/or the like). FIG. 8 illustrates an example wireframe providing data indicative of example order/delivery exceptions for a particular location. As shown therein, the order/delivery exceptions data may define pick-up/drop-off windows for cash orders (e.g., corresponding to the open hours of a particular commercial establishment), and may define one or more specific holidays during which the particular location is unavailable for deliveries/pick-ups (e.g., December 25, as defined in the example wireframe).

In various embodiments, data indicative of manual adjustments may be created and/or maintained within a location profile or a customer profile. In certain embodiments, manual adjustment data may be defined with respect to a customer profile, and may be disseminated to a plurality of location profiles linked with the customer profile. Moreover, data indicative of the manual adjustments may be provided on a denominational basis, to augment an operational fund (discussed in greater detail herein) for each denomination stored and dispensed from the cash handling device 100. In these embodiments, the manual adjustments may be provided to define a minimum quantity (or value) of each denomination that is available for withdrawal from the cash handling device 100. As a specific example, the manual adjustments may define a minimum amount of $1,000 in $20 bills must remain accessible within the cash handling device 100, a minimum of $3,000 in $1 bills must remain accessible within the cash handing device 100, and/or the like.

In other embodiments, the manual adjustments may be provided as a denomination-agnostic adjustment to augment the operational fund for the cash handling device 100. For example, the manual adjustments may indicate that a minimum of $5,000 must remain accessible for withdrawal from the cash handling device 100, regardless of denomination.

The manual adjustment data may be defined by an absolute count (e.g., an absolute value or quantity of unit, such as $1,000 in $20 bills, or 50 $20 bills) or a percentage of a total (e.g., maintain an additional amount equal to a minimum of 35% of an estimated daily usage). The manual adjustment data may be time-dependent, and may be defined by absolute date (e.g., the manual adjustment applies between November 20 and December 25 each year), day of week (e.g., the manual adjustment applies for each Friday), day of month (e.g., the manual adjustment applies for the 15th and 30th of each month), and/or the like. These manual adjustments may thereby be included to increase the operating fund of a cash handling device 100 to account for expected future spikes in usage (which may be not be anticipated solely based on historical data). Data indicative of manual adjustments that may be provided for a particular location are reflected in the example wireframe of FIG. 9. In the example shown in FIG. 9, manual adjustments are defined in the portion of the graphical display entitled "Auto Order Adjustments" (located at the bottom right of the figure). In the example, a manual adjustment is in effect from the dates of December 1 to December 31, and applies to all currency, all denominations, and defines a manual adjustment of 20% relative to the defined forecast usage for the cash handling device. In other words, the manual adjustment as defined in the example requires 20% more cash within the cash handling device than the forecasting methodology predicts will be used during a given period of time.

The cash movement data may be indicative of the amount of cash moved from a recycler cassette (e.g., a recycler cassette providing cash accessible for withdrawal) to a deposit cassette (e.g., a deposit only cassette). Such cash movement may be initiated in preparation for a change order (e.g., picking up cash from the cash handling device) or to alleviate an overflow within the recycler cassette.

As discussed herein, the till definitions may be defined and/or maintained within a location profile. The till definitions may provide descriptive names (e.g., text strings) indicative of tills (e.g., indicative of names of departments in which specific tills are located). As examples, the till definition may specify that a particular till is the "electronics" department till, the "front end" till, the "pharmacy" till, and/or the like. In certain embodiments, the till definitions may be utilized to provide till-specific data (e.g., till-specific data regarding cash usage) based on withdrawals and/or deposits made from/to a cash handling device 100 on behalf of a specific till. Example till definitions are shown in the example wireframe shown in FIG. 9.

In various embodiments, data indicative of existing change orders may be indicative of change orders that have been placed with a financial institution, either automatically through the process discussed herein, or manually (e.g., through a financial institution's computing system), but which have not yet been delivered to the cash handling device 100. Accordingly, the data indicative of existing change orders ensures that any funds scheduled to arrive at a particular cash handling device 100 are considered when determining whether another, new change order is necessary to maintain a desired operating fund level at a particular cash handling device 100.

Data indicative of bank holidays provides data indicative of dates on which a financial institution is able to process change order requests. These holidays may be provided as absolute dates (e.g., defined manually), as data input automatically received from a financial institution computing entity, as data indicative of known bank holidays (e.g., indicated by holiday name) which may be utilized to automatically populate absolute dates by the management server 300, and/or the like. Data indicative of example bank holidays is shown in the example wireframe of FIG. 11.

Data indicative of actual/default usage may be defined as the difference in value (or absolute quantity) of cash that is checked out from a cash handling device 300 and the value (or absolute quantity) of cash that is checked back into the cash handling device 100 for a given till. In certain embodiments, the management server 300 is configured to extract actual usage data for a given time period (e.g., a moving time period, such as a most-recent 60-day period) for the given time period for each historical year. In certain embodiments, the management server 300 is configured to review forecast data for a future time period (e.g., the next 7 days) by shifting the moving time period forward by the future time period. As an example, to forecast usage for the next 7 days, the management server 300 may be configured to define the time period of interest as the period of time ending 7 days in the future and beginning 60 days prior to the ending of the time period. The management server 300 may thus review historical data from prior years during the same time period to determine predictions for the next 7 days. In certain embodiments, historical data considered during such analysis is assigned weights based on temporal proximity to the current day. Usage from historical time periods is determined based on check out and check in times for particular tills, and usage is assigned to a particular day in which it occurred. The usage for a particular cash handling device may then be determined for each day (e.g., by summing usage for individual tills), by denomination, and then an average daily usage may be determined for individual weeks (again, by denomination).

For new locations having minimal or no historical data that may be used for forecasting, the management server 300 may be configured to utilize historical data from one or more other locations identified as surrogate data sources for the newly establish cash handling device 100. In such instances, the newly established cash handing device 100 utilizes the historical data from the identified surrogate data source location for calculating usage estimates. Alternatively, the management server 300 may be configured to receive user input assigning a usage profile (e.g., a manually defined historical data set or a manually defined set of forecast data) that may be utilized to establish forecasting data for the newly established location.

Data indicative of the current contents of the cash handling device 100 is received from the cash handling device 100, and is indicative of the actual, current contents, by denomination, of cash within the cash handling device 100. The data may be indicative of the current contents of one or more recycler cassettes of the cash handling device 100, the current contents of one or more deposit cassettes of the cash handling device 100, and/or the like. The data indicative of the current contents of the cash handling device comprises data indicative of the current contents of any recycling cassettes within the cash handling device 100, any deposit cassettes of the cash handling device, any overflow bins of the cash handling device, any coin hoppers of the cash handling device, and/or the like. The data indicative of the current contents of the cash handling device may be provided on a denominational level (e.g., current contents of $20 bills, current contents of $5 bills, and/or the like), on a cassette level (e.g., current contents of the recycler cassettes (individually and/or collectively), current contents of deposit cassettes (individually and/or collectively), current contents of coin hoppers (individually and/or collectively), and/or the like), on an aggregate level (summing the total current contents of the cash handling device 100), and/or the like. The data indicative of the current contents of the cash handling device may be provided periodically, or upon the occurrence of defined trigger events. For example, upon the cash handling device 100 receiving an End-of-Day indication for a particular transactional period, the cash handling device 100 may generate and transmit data indicative of the current contents of the cash handling device 100 to the management server 300.

Data indicative of cash advances may be indicative of average advances of cash to tills. Such data may be provided by day of week and/or by denomination. Such data may additionally comprise forecast data for a given time period in the future, and such calculations may be performed in a manner similar to that discussed above for actual/default usage calculations. For example, historical data from a current time period (e.g., ending 7 days in the future and beginning 60 days before the end of the given time period) may be identified from prior years, and such historical data may be utilized to determine estimates for future cash advances.

The scheduling data indicative of existing change orders may be maintained at a location profile and may define the days of the week and window (start and stop) that a carrier is scheduled to visit a given location for change order execution.

With reference again to FIG. 6, once the data is collected for a given order record, the management server proceeds to initiate processes for creation of a forecast for the given location. As shown at Block 602, a target operating fund is calculated for each location, for each day. The target operating fund may be calculated by the following:

$$OF_N = \left(\sum_0^T TC \times T\right) + A_N + MA$$

In the above equation, the operating fund (OF) for a given day (N) is calculated by determining the total value of funds within each till (TC), multiplying this sum by the number of tills (T), and adding the product to the cash advance (A) for the given day and the manual adjustment (MA) applicable to the given day. As noted herein, the manual adjustment may be defined for a particular location (e.g., within a location profile) and/or for a particular customer (e.g., within a customer profile). The given day (N) is reflected by N=0 for the current day, N=1 for the current day+1, N=2 for the current day+2, etc.

Beginning with N=0 (where the starting contents are the actual contents of the cash handling device 100), the start of day content is calculated for each day as indicated at Block 603, for example, as follows:

$$SC_{N+1} = SC_N + CO_N + U_N + CO_{auto,N} - M_N - MM_N$$

The starting content (SC) for a given day (N+1) can be considered equal to the ending value for the prior day (N). Thus, the starting content for a given day is calculated by adding the starting content of the prior day ($SC_N$), the value of change orders processed for the prior day ($CO_N$), the average usage of the prior day ($U_N$), and the value of any automatically placed change orders for the prior day ($CO_{auto,N}$), less the average value moved to the deposit cassettes ($M_N$), less the value of any cash otherwise moved from the recycler cassette (e.g., manually) ($MM_N$).

Each of these values may be forecast from a prior day or may be determined based on data provided to the management server. For example, the value of any change orders automatically ordered may be known to the management server 300 prior to those change orders arriving at the cash handling device 100. As discussed herein, the management server 300 may generate those change orders, and therefore the ordered value of those change orders may be utilized for forecasting the amount of currency within a particular cash handling device 100.

It should be understood that the above methodologies may be performed on a denominational level (e.g., determining the amount of a particular denomination within a cash handling device 100) or in the aggregate (e.g., determining the total value of funds within a cash handling device 100).

With reference again to FIG. 6, in certain embodiments, the management server 300 may calculate an end-of-day deposit cassette content in accordance with Block 604, for example, as follows:

$$DC_N = DC_{N-1} + D_N$$

Where the deposit cassette content for a given day ($DC_N$) is calculated by summing the deposit cassette content from the prior day ($DC_{N-1}$) and the average deposits to the deposit cassette by day ($D_N$).

For each day after the current day (e.g., for N=1 through N=6), the management server 300 determines whether the forecast starting content is sufficient to satisfy the forecast needed operating fund for the given day, as indicated at Block 605. In other words, the management server 300 subtracts the operating fund for a given day ($OF_N$) from the starting content for a given day ($SC_N$). Upon determining that the answer is positive (greater than zero), the management server 300 determines that the starting content is sufficient to satisfy the forecast operating fund for the given day. Upon determining that the answer is negative (less than zero), the management server 300 determines that the starting content is insufficient to satisfy the forecast operating fund for the given day.

Determinations of whether the cash handling device 100 has sufficient cash available within recycler cassettes may be made on a denominational level (e.g., for each denomination of cash stored therein) and on a daily basis (e.g., making a determination of whether tomorrow's cash reserves within the cash recycler are sufficient to satisfy the daily target operating fund; making a determination of whether the next day's cash reserves within the cash recycler are sufficient to satisfy the daily target operating fund; etc.). Thus, the management server 300 may be configured to determine that cash contents of the recycler cassette of a particular cash handling device 100 are forecast to be sufficient to satisfy daily operating funds for the next 3 days, but a change order is needed to replenish cash prior to the $4^{th}$ day. Similarly, the management server 300 may be configured to determine that cash contents of the recycler cassette of a particular cash handling device 100 are forecast to be sufficient to satisfy daily operating funds for $1 bills, $5 bills, $10 bills, and $20 bills for the next three days, but additional $1 bills are needed prior to starting the fourth business day.

Determinations of whether the cash handling device 100 has sufficient cash available within recycler cassettes to satisfy daily target operating funds for each day are made in chronological order, beginning at the current day and proceeding into the future, utilizing forecast data for each future date, until reaching the last day for which forecasts are generated (e.g., 7 days into the future).

Upon identifying a shortfall day for which the contents of the cash handling device 100 are forecast to fall below the target daily operating fund, the management server 300 may be configured to stop iterating through future days, and to initiate a process for identifying a best-possible day/time for scheduling a change order to replenish cash reserves within the cash handling device 100 prior to the identified shortfall day. Because the infusion of cash from the change order will impact cash reserves within the cash handling device for all days occurring after the day on which the change order is executed, the management server need not make any future forecasts until the change order is scheduled.

The management server 300 may be configured to work backwards from the identified shortfall day to identify the first available date/time on which a change order may be executed for the particular location. Said from a different perspective, the management server identifies an optimal date/time that is temporally close to the identified shortfall day for which a change order may be executed for the cash handling device 100. The management server 300 seeks to initiate the change order as close-in-time to the identified shortfall day so as to minimize the amount of time that the cash handling device 100 operates with a large surplus of cash stored therein. As a specific and non-limiting example, if the management server 300 identifies next Wednesday as a shortfall day, the management server 300 will begin by attempting to initiate a change order for next Tuesday. If a change order cannot be executed next Tuesday, the management server 300 will attempt to initiate a change order for next Monday, and so on until the management server 300 is back to the current day. Ultimately, if the management server 300 is unable to identify a prospective date/time for a change order to remediate the identified shortfall day, the management server 300 may flag the shortfall day for manual intervention by a user.

In certain embodiments, identifying a potential date/time for a change order comprises considering a plurality of data types relevant for a particular location. For example, data stored within a location profile and/or data stored within a customer profile having applicability to a particular location may be considered when identifying potential dates/times for a change order. In certain embodiments, data such as order/delivery exception data, data indicative of bank holidays, data indicative of existing scheduled change orders, and/or the like may be considered to identify a potential date/time during which a change order may be processed. As a specific example, working backwards in time from the identified shortfall day, the management server 300 is configured to identify the first date/time during which the cash handling device is accessible (e.g., the location is open such that a carrier can physically access the cash handling device), a financial institution funding the change order is open, and the carrier is available to complete the change order delivery.

In various embodiments, the management server 300 may additionally consider existing change orders scheduled for the cash handling device 100 when attempting to initiate a new change order for a shortfall day. In such embodiments, upon determining that an additional change order cannot be scheduled after an existing change order but before an identified shortfall day, the management server 300 may be configured to modify the existing change order to address the identified shortfall day.

Upon identifying a date/time for a change order to remedy the shortfall day, the management server 300 is configured to initiate a change order at the identified date/time, as indicated at Block 607. In certain embodiments, the management server 300 may be configured to generate and transmit a change order request to one or more of a financial institution and/or a carrier to initiate the change order. In certain embodiments, the management server 300 may be configured to provide data to one or more third party computing systems (e.g., operated by a financial institution and/or a carrier) via one or more application program interfaces (APIs) to schedule the requested change order.

Upon scheduling the change order, the management server operation proceeds to again calculate the daily starting content of the cash handling device as indicated at Block 603, and to determine whether the starting content satisfies the daily operating fund, as indicated at Block 605. Again, if the management server 300 identifies another shortfall day, considering the newly scheduled change order, the management server 300 again proceeds to identify an optimal change order date/time for another change order to satisfy the newly identified shortfall day (as indicated at Block 606), and to initiate the change order to identify the newly identified shortfall day (as indicated at Block 607). In certain embodiments, the shortfall day identified after scheduling a change order will be chronologically after the previously identified shortfall day. This process may repeat as needed until the management server 300 completes the forecasting (e.g., iterates through all future days for which a forecast is to be provided) without identifying a shortfall day.

The management server 300 may be configured to repeat the process as discussed in reference to FIG. 5 daily (e.g., upon receipt of a trigger event indicating an EndDay transaction is generated at a cash handling device 100). Thus, forecasts for future days may be adjusted as the current day gets closer to each forecast day, to better account for actual usage occurring at the cash handling device 100. In certain embodiments, upon determining that a previously scheduled change order is unnecessary (e.g., due to unexpected characteristics of actual usage), the management server 300 may be configured to generate change order cancelation requests to be provided to the financial institution and/or the carrier to cancel unneeded change orders. In certain embodiments, a determination that a particular change order is unnecessary may be made by comparing expected starting contents of the cash handling device 100 on a given day against defined maximum cash contents (e.g., defined within customer profiles and/or location profiles). Upon determining that the amount of cash within the cash handling device 100 exceeds the defined maximum cash contents for the cash handling device, the management server 300 may be configured to determine that a near-in-time change order is unnecessary. As yet another example, upon determining a surplus of cash forecast to be present within the cash handling device 100 on a given day (e.g., an amount of cash within the forecast starting contents that exceeds a daily operating fund for the given day), the management server 300 may be configured to compare the cash excess against an amount of cash scheduled to be delivered to the cash handling device 100 in a change order occurring immediately prior to the day of the estimated cash surplus. If the estimated cash surplus exceeds the amount of cash scheduled to be delivered to the cash handling device 100 during the change order, the management server 300 may be configured to cancel the change order. However, prior to canceling the change order, the management server 300 may be configured to determine whether the cancelation of a particular change order would result in the creation of a shortfall day occurring after the scheduled change order (e.g., by calculating differences between the daily starting content and the daily operating fund without the scheduled change order, and determining whether any shortfall days would be created by canceling a scheduled change order). Upon determining that cancelation of a change order would result in the creation of a shortfall day, the management server may refrain from canceling the change order.

As an additional explanatory example, it should be understood that multiple shortfall days may be remedied with a single change order. For example, if an upcoming Saturday is identified as a shortfall day, the management server 300 may initiate a change order for the immediately prior Friday. If the immediately following Sunday is still identified as a shortfall day even after scheduling the change order for Friday, the change order may be adjusted to accommodate the expected shortfalls on both Saturday and Sunday (e.g., upon determining that a change order may not be processed on Saturday). If the immediately following Monday is likewise still identified as a potential shortfall day, the change order may be again adjusted to address the forecast shortfalls for all of Saturday, Sunday, and Monday (e.g., upon determining that a change order may not be processed on either Saturday or Sunday).

Similarly, a change order may be scheduled multiple days prior to a forecast shortfall day. For example, if a Monday after a long weekend (e.g., the prior Friday is identified as a bank holiday) is forecast to be a shortfall day, the management server 300 may be configured to initiate a change order to occur on the prior Thursday, even if that change order would result in a large surplus of cash present within the cash handling device on Friday, Saturday, and Sunday.

Figure 6:
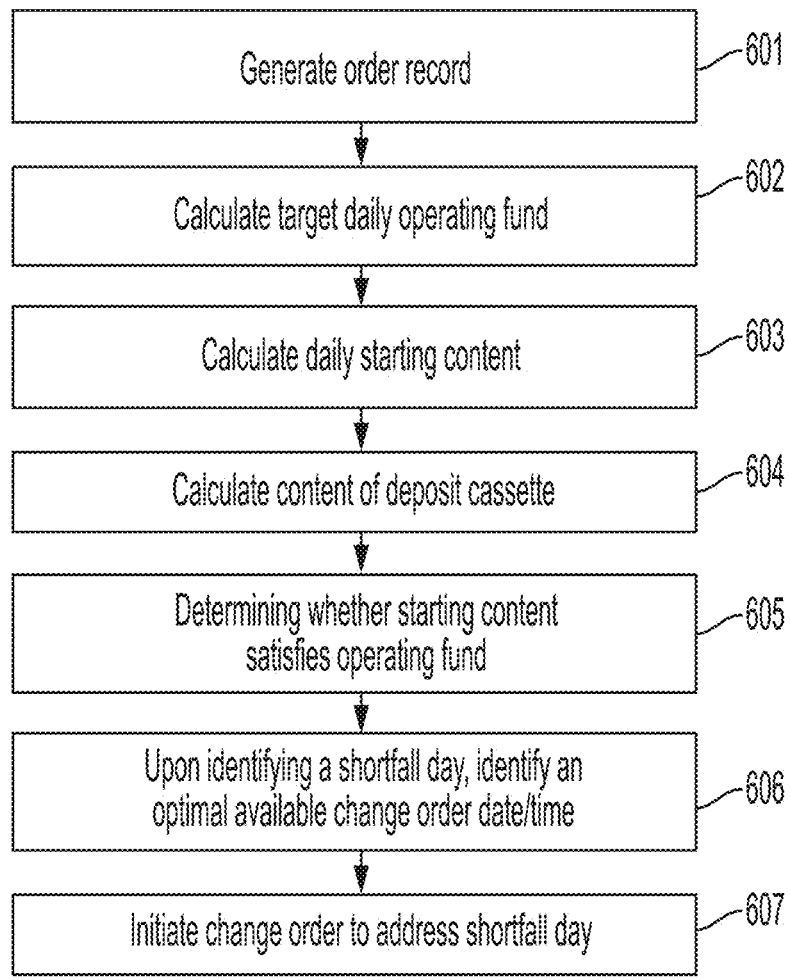
FIG. 6 is a flowchart illustrating example steps for initializing a change order according to various embodiments.

Moreover, because multiple change orders may be needed for a forecast period, and because iterations of the process described in reference to FIG. 6 may result in modifications to initiated change orders to accommodate multiple shortfall days identified during separate iterations of the processed discussed herein, the management server 300 may be configured to await completion of the forecasting process (e.g., await a determination that no shortfall days are identified) prior to transmitting change orders to one or more third party computing systems. Thus, the management server 300 may be configured to store data indicative of initiated change orders in a temporary memory storage location (e.g., a cache) during iterations of the process discussed in reference to FIG. 5. As adjustments are identified as needed to the various change orders, the management server 300 may adjust the data stored within the temporary memory storage location regarding the adjusted change orders during each iteration of the process discussed herein. Upon completion of the process discussed herein with reference to FIG. 6 (upon determining that no further changes are necessary to change orders to address forecast shortfall days), the management server 300 may transmit data indicative of the requested change orders to one or more third party computing systems (e.g., a computing system operated by a financial institution and/or a computing system operated by a carrier) to initiate the change orders. In certain embodiments, change order requests may be transmitted to financial institution computing systems together with previously scheduled data transmissions (e.g., data transmissions to provide data indicative of the contents of a particular cash handling device to the financial institution), thereby minimizing the amount of data transmitted between the management server 300 and the financial institution computing system.

Moreover, after scheduling the one or more change orders for a particular cash handling device 100, the management server 300 may be configured to store data indicative of the scheduled change orders in a location profile associated with the cash handling device 100, such that future iterations of the process discussed herein (e.g., occurring on a future date) for forecasting the contents of a cash handling device 100 are performed with a consideration of the scheduled change orders. In certain embodiments, the one or more change orders are stored in an XML document. The XML document may be transmitted to one or more external computing entities (e.g., a financial institution computing entity, a carrier computing entity, and/or the like). Accordingly, in certain embodiments, the XML document (or other file type) may be provided to the one or more external computing entities to instruct external entities regarding needed change orders.

It should be understood that certain embodiments may be configured for intaking user input regarding manually entered change orders. Data indicative of the manually entered change orders may be stored within the XML document (or other file type, as applicable) along with automatically generated change orders. In certain embodiments, data indicative of manually generated change orders may be flagged or otherwise indicated as being indicative of manually generated change orders (e.g., to aid in manual inspection of the XML document, if needed). However, manually generated change orders may be executed in a manner identical to automatically generated change orders (e.g., by being intake into applicable external (e.g., third party) computing entities, such as those of financial institutions and/or carriers, and by scheduling applicable tasks for employees of those third party entities, for example, to pack and load cash into transfer containers (e.g., bags) and to transport cash usable within those change orders to the applicable location/cash handling device).

Figure 12:
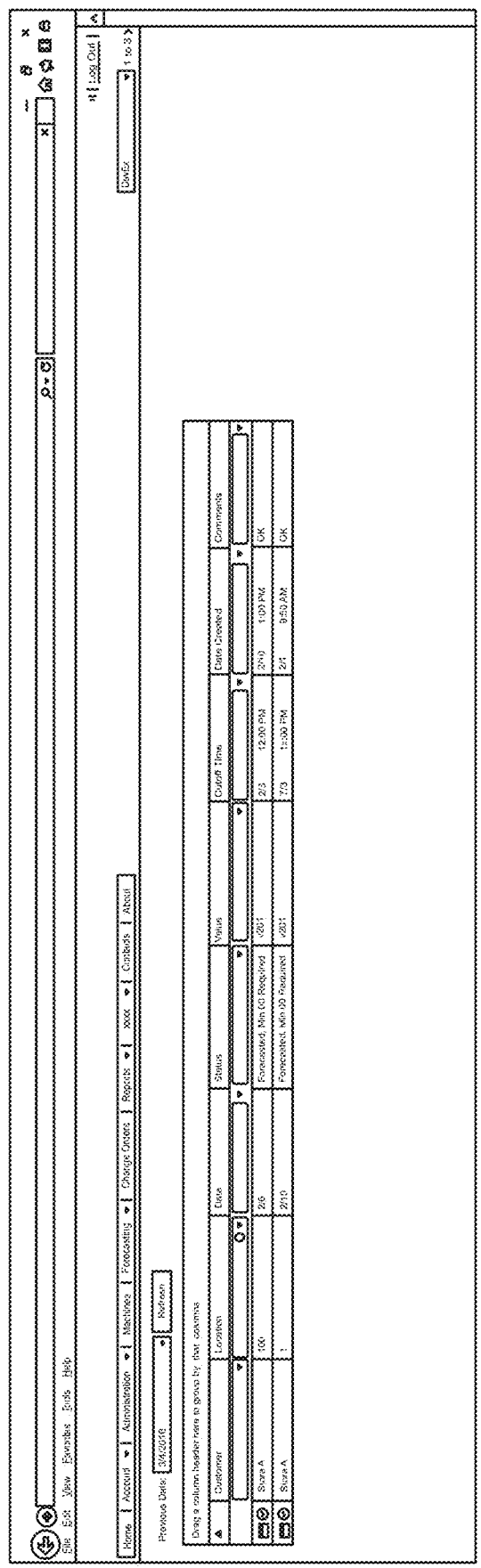

Moreover, as shown in the example wireframe of FIG. 12, the management server 300 maintains a queue of scheduled future change orders that may be reviewed by a user. In light of the configuration for automatically scheduling and descheduling change orders as discussed above, it should be understood that the contents of this queue may change automatically over time, as new change orders are determined to be needed (and thus new change orders are scheduled) and/or as existing change orders are determined to be unneeded (and thus previously existing change orders are canceled). Moreover, the change order queue may be interactive, such that users may select one or more scheduled change orders to obtain additional information about the scheduled change order and/or to manually cancel a scheduled change order. Similarly, the change order queue may be configured to receive user input requesting a newly scheduled change order to be added to the change order queue. The user input may comprise data indicative of a location where the change order should be delivered, a requested date and time of the requested change order, a financial institution selected to fulfill the change order (if applicable), a carrier selected to fulfill the change order (if applicable), and/or the like. Such user input may be provided via a user fillable form with one or more free-form text entry fields and/or one or more selectable options for various data fields.

Figure 13:
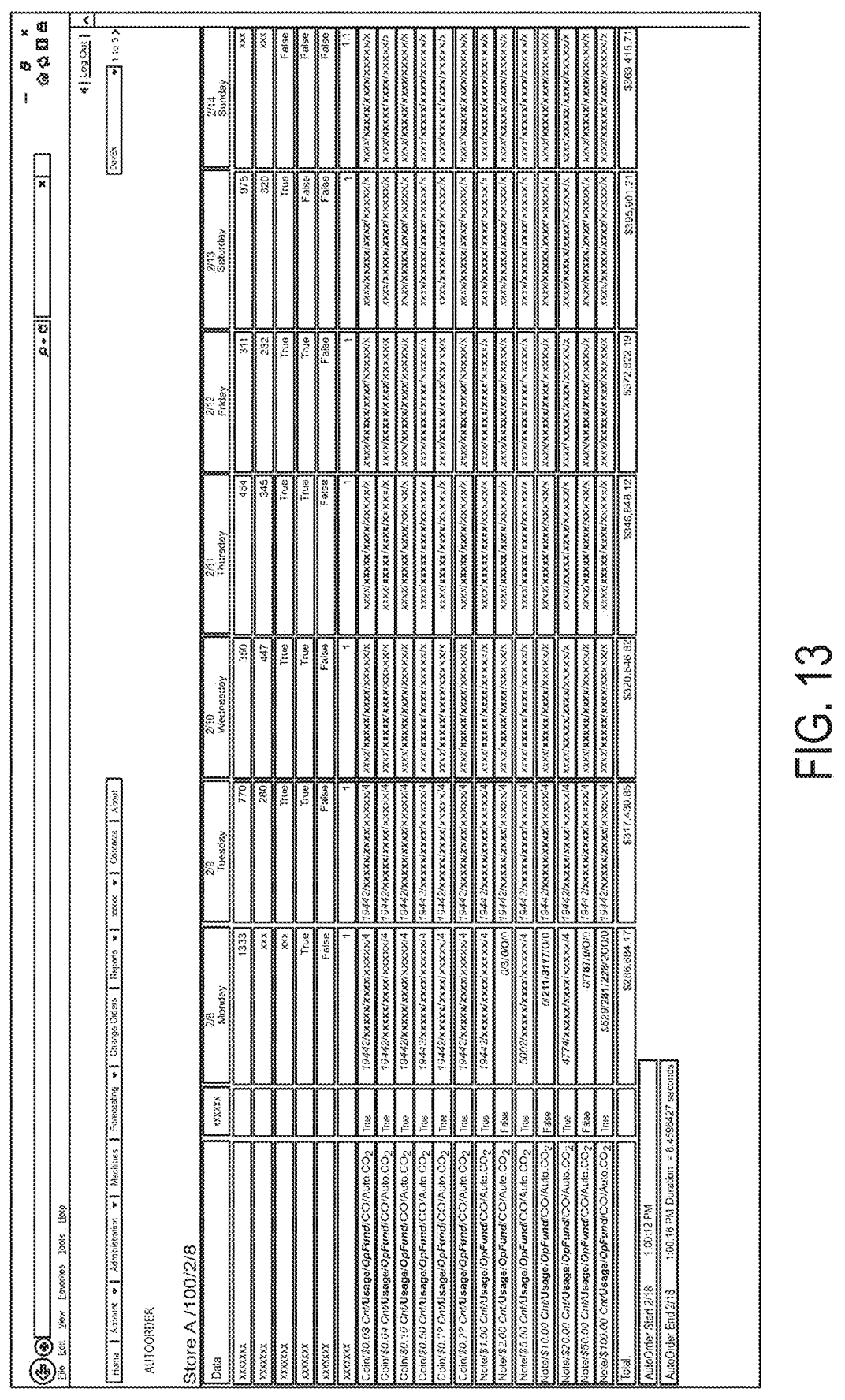

With reference again to the figures, selecting a scheduled change order for a particular location causes the management server 300 to provide additional information regarding upcoming change orders and forecast data, for example, in the form of a graphical user interface as shown in FIG. 13. To provide additional context, FIGS. 12-13 provide example data illustrative of two change orders scheduled to a hypothetical cash handling devices 100 managed by Customer "Store A" (Specifically cash handling devices at locations "100" and "1", respectively, of Store A). As shown in FIG. 12, a change order is scheduled for location 100 on February 8. The queue indicates that location 100 is currently being forecast successfully, and no change orders are deemed necessary as a result of the forecasting. Thus, the scheduled change order is a manually requested change order. The change order queue additionally indicates the indicator of the vault associated with the cash handling device, the cutoff time for the vault for performing the change order, the date the change order was created, and any applicable comments. Similar information is provided for the change order scheduled for Location 1, which is scheduled for February 11.

Selecting the change order scheduled for Location 100 provides additional information in the form of a user interface as shown in the example of FIG. 13. This user interface provides forecast for the particular location, which may be determined utilizing the process discussed above. In the illustrated example, forecast data is provided between dates 2/8 to 2/14.

In the illustrated embodiment, the user interface provides forecast contents of deposit cassettes on each forecast day (in terms of number of bills) for the location (in the illustrated example, the location includes 2 deposit cassettes-reflected by rows "Deposit 1" and "Deposit 2" although it should be understood that any number of deposit cassettes may be reflected in the provided user interface).

In the next displayed rows, the user interface indicates whether deliveries are allowed, whether change orders are allowed, and whether an automatic change order is scheduled for each forecast date, respectively. Such data may be retrieved from location profiles, customer profiles, and/or the like, and may be reflective of bank holidays, customer- (or location-) specific exceptions, and/or the like. Such data fields may comprise binary "true" or "false" inputs.

The next row indicates whether an "uncertainty" or other manual adjustment is reflected within the forecast data for the particular day. The data may comprise binary inputs (true or false), or may comprise non-binary inputs indicative of a level of manual adjustment reflected therein. For example, the data may be indicative of a multiple of a defined standard manual adjustment (e.g., 20%). In such embodiments, a value of "0" may indicate that no manual adjustment is reflected therein, a value of "1" indicates that the standard manual adjustment is reflected therein, a value of "1.5" indicates that 1.5× the standard manual adjustment is reflected therein (e.g., if the standard manual adjustment is 20%, a value of 1.5 indicates that a manual adjustment of 30% is reflected therein), a value of "2" indicates that 2× the standard manual adjustment is reflected therein, etc.

The next rows contain denomination-specific data for the particular location. For each row, the user interface indicates whether the cash handling device 100 provides recycle services for the denomination (in the first substantive column for each denomination which includes binary "true" or "false" entries), and provides forecast data for each forecast day. In the illustrated embodiment, data is provided for the following denominations: $0.01; $0.05; $0.10; $0.25; $0.50; $1.00 (coin); $1.00 (note); $2.00; $5.00; $10.00; $20.00; $50.00; and $100.00.

For each denomination and day, the following information is provided for the recycler capabilities of the particular cash handling device 100: forecast contents, forecast usage, forecast operating fund, manually scheduled change orders, and automatically scheduled change orders. Each of these data fields may be highlighted in a different color to ease legibility of the user interface.

Taking the $1.00 (note) row as an example, the user interface reflects that the cash handing device at Location 100 for Store A provides recycle capabilities for $1.00 notes (by contrast, the user interface indicates that the cash handling device does not provide recycle capabilities for $2.00 notes, as reflected in the immediately following row). For the first scheduled date, February 8, the graphical interface indicates that the cash handling device is forecast to contain 9819 $1.00 notes within recycle cassettes thereof; the estimated daily usage for $1.00 notes is −804 notes (reflecting a forecast outflow of 804 notes, likely to be returned to customers of Store A as change for larger notes). The operating fund for February 8 is forecast to be 4070 notes for the cash handling device, there is a manually scheduled change order to deliver an additional 900 $1.00 notes to the cash handling device on February 8 (as also reflected on the prior user interface reflected at FIG. 12), and there are no automatically scheduled change orders occurring on February 8 (which is consistent with the determination that the forecast operating fund is less than the forecast contents for the given day, thereby indicating that the cash handling device is forecast to contain sufficient funds to satisfy the forecast operating fund). Similar information is provided for February 9 through February 14, although no change orders are scheduled for February 9, February 10, February 12, February 13, or February 14. Another manually scheduled change order is scheduled for February 11, during which time a much larger delivery of 2800 $1.00 notes are scheduled to be delivered to the cash handling device (likely to accommodate a much longer period of time before the next scheduled change order, due to the weekend being shortly after the February 11 change order).

Cash Handling Device Operation Alerts

In addition to functional information provided regarding forecast usage of cash stored within various cash handling devices 100, the management server 300 is further configured for management the functional health of cash handling devices 100 and for providing appropriate notifications to users of the management server 300 to troubleshoot or to provide other maintenance related services upon determining that one or more cash handling devices 100 are malfunctioning. In various embodiments, the one or more cash handling devices 100 may comprise one or more sensors (e.g., force feedback sensors associated with one or more cash movement mechanisms or other component movement mechanisms within the cash handling device 100) that are configured to determine whether various movable components are functioning properly. It should be understood that other sensors and/or other monitoring mechanisms may be disposed within applicable portions of cash handling devices 100 for ensuring proper functionality thereof.

In various embodiments, each cash handling device 100 may periodically (e.g., at defined time intervals) transmit a health signal to the management server 300 indicative of whether various components thereof are properly functioning. The health signal may comprise data indicative of the functional health of various components of the cash handling device 100 (e.g., binary indications of whether various monitored components are operating properly or malfunctioning). In addition to the data contained within the transmission, the management server 300 may utilize metadata indicative of whether the health signal was received at an expected time period to determine whether the cash handling device 100 is functioning properly. For example, if a health signal is received late or not received at all, the management server 300 may be configured to determine that the cash handling device's network connection is not properly functioning.

In other embodiments, each cash handling device 100 may be configured to transmit a health signal only upon identifying one or more malfunctions of the cash handling device 100. In such embodiments, the health signal may comprise one or more error signals generated by the cash handling device 100 prior to the transmission of the health signal.

Upon receipt of the health signal of one or more cash handling devices 100, the management server 300 may be configured to provide one or more notifications to relevant users of the health of the cash handling devices 100. Such notifications may be provided via graphical displays accessible to users via a computer program (e.g., a web-accessible computer program additionally configured for providing forecast data regarding the various cash handling devices 100), or notifications may be provided by transmitting notifications to the user via one or more contact methods (e.g., sending emails indicative of a health status of one or more cash handling devices 100, sending a text message indicative of a health status of one or more cash handling devices, and/or the like).

In certain embodiments, health status data for one or more cash handling devices 100 may be provided to identified users having access to data regarding one or more cash handling devices 100. Data indicating whether a user has access to the one or more cash handling devices may be provided within a user profile, a location profile, a customer profile, and/or the like.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for cash handling device operation management, the system comprising one or more non-transitory memory storage areas and one or more processors collectively configured to:
   monitor closing transaction data from a cash handling device identifying physical cash movement within the cash handling device for each of a plurality of cash denominations and identifying physical cash locations in a recycler cassette of the cash handling device and in a deposit cassette of the cash handling device, wherein the deposit cassette does not provide automated cash dispensing;
   trigger a forecasting process for the cash handling device upon receiving data identifying physical cash movement from the recycler cassette to the deposit cassette, the forecasting process comprising:
   retrieving historical usage data for each of the plurality of cash denominations from each register till of the plurality of register tills; and
   determining an operating fund for each register till of the plurality of register tills based at least in part on one or more of the historical usage data or manual adjustments, wherein the operating fund for each register till of the plurality of register tills identifies an operating fund amount for each of a plurality of cash denominations for a forecast period;
   determining a forecast starting content for each of the plurality of cash denominations within the recycler cassette at the cash handling device for the forecast period;
   comparing the forecast starting content for each of the plurality of cash denominations against the operating funds determined for each of the plurality of register tills; and
   generate a user interface displaying the operating funds determined for each of the plurality of register tills.

2. The system for cash handling device operation management of claim 1,
   wherein determining a forecast starting content for each of the plurality of cash denominations at the cash handling device for the forecast period comprises retrieving a closing content for each of the plurality of cash denominations from the closing transaction data.

3. The system for cash handling device operation management of claim 2, wherein the forecast period is embodied as a first forecast period of a plurality of forecast periods, and wherein the plurality of forecast periods comprise the first forecast period and a second forecast period occurring consecutively after the first forecast period; and
   wherein the forecasting process additionally comprises determining a second forecast starting content for each of the plurality of cash denominations for the second forecast period at least in part by:
   determining a forecast closing content for each of the plurality of cash denominations after the first forecast period based at least in part on one or more of: the closing transaction data and historical data relevant to the first forecast period.

4. The system for cash handling device operation management of claim 1, wherein the one or more processors are further configured to, upon determining the forecast starting content for at least one of the plurality of cash denominations does not satisfy the operating funds for the plurality of register tills for the forecast period:
  determine a cash transfer time to provide a forecast starting content of each of the plurality of cash denominations to satisfy the operating fund for each of the plurality of cash denominations for the forecast period; and
  populate a portion of an order record with data identifying the cash transfer time.

5. The system for cash handling device operation management of claim 1, wherein the forecasting process additionally comprises:
  determining a forecast content of cash within the deposit cassette at the cash handling device for the forecast period;
  comparing the forecast content of cash within the deposit cassette at the cash handling device against a deposit cassette threshold; and
  upon determining that the forecast content of cash within the deposit cassette at the cash handling device for the forecast period exceeds the deposit cassette threshold for the forecast period, transmitting an order record to an external computing entity to initialize a cash transfer from the cash handling device.

6. A computer-implemented method for cash handling device operation management, the method comprising:
  monitoring closing transaction data from a cash handling device identifying physical cash movement within the cash handling device for each of a plurality of cash denominations and identifying physical cash locations in a recycler cassette of the cash handling device and in a deposit cassette of the cash handling device, wherein the deposit cassette does not provide automated cash dispensing;
  triggering a forecasting process for the cash handling device upon receiving data identifying physical cash movement from the recycler cassette to the deposit cassette, the forecasting process comprising:
    retrieving historical usage data for each of the plurality of cash denominations from each register till of the plurality of register tills; and
    determining an operating fund for each register till of the plurality of register tills based at least in part on one or more of the historical usage data or manual adjustments, wherein the operating fund for each register till of the plurality of register tills identifies an operating fund amount for each of a plurality of cash denominations for a forecast period;
    determining a forecast starting content for each of the plurality of cash denominations within the recycler cassette at the cash handling device for the forecast period;
    comparing the forecast starting content for each of the plurality of cash denominations against the operating funds determined for each of the plurality of register tills; and
    generating a user interface displaying the operating funds determined for each of the plurality of register tills.

7. The computer-implemented method for cash handling device operation management of claim 6, wherein determining a forecast starting content for each of the plurality of cash denominations at the cash handling device for the forecast period comprises retrieving a closing content for each of the plurality of cash denominations from the closing transaction data.

8. The computer-implemented method for cash handling device operation management of claim 7, wherein the forecast period is embodied as a first forecast period of a plurality of forecast periods, and wherein the plurality of forecast periods comprise the first forecast period and a second forecast period occurring consecutively after the first forecast period; and
  wherein the forecasting process additionally comprises determining a second forecast starting content for each of the plurality of cash denominations for the second forecast period at least in part by:
    determining a forecast closing content for each of the plurality of cash denominations after the first forecast period based at least in part on one or more of: the closing transaction data and historical data relevant to the first forecast period.

9. The computer-implemented method for cash handling device operation management of claim 6, wherein the forecasting process additionally comprises:
  determining a forecast content of cash within the deposit cassette at the cash handling device for the forecast period;
  comparing the forecast content of cash within the deposit cassette at the cash handling device against a deposit cassette threshold; and
  upon determining the forecast content of cash within the deposit cassette at the cash handling device for the forecast period exceeds the deposit cassette threshold for the forecast period, transmitting an order record to an external computing entity to initialize a cash transfer from the cash handling device.

10. A computer program product comprising a non-transitory computer readable medium having computer program instructions stored therein, the computer program instructions when executed by a processor, cause the processor to:
  monitor closing transaction data from a cash handling device identifying physical cash movement within the cash handling device for each of a plurality of cash denominations and identifying physical cash locations in a recycler cassette of the cash handling device and in a deposit cassette of the cash handling device, wherein the deposit cassette does not provide automated cash dispensing;
  trigger a forecasting process for the cash handling device upon receiving data identifying physical cash movement from the recycler cassette to the deposit cassette, the forecasting process comprising:
    retrieving historical usage data for each of the plurality of cash denominations from each register till of the plurality of register tills; and
    determining an operating fund for each register till of the plurality of register tills based at least in part on one or more of the historical usage data or manual adjustments, wherein the operating fund for each register till of the plurality of register tills identifies an operating fund amount for each of a plurality of cash denominations for a forecast period;
    determining a forecast starting content for each of the plurality of cash denominations within the recycler cassette at the cash handling device for the forecast period;

comparing the forecast starting content for each of the plurality of cash denominations against the operating funds determined for each of the plurality of register tills; and generate a user interface displaying the operating funds determined for each of the plurality of register tills.

11. The computer program product of claim 10, wherein determining a forecast starting content for each of the plurality of cash denominations at the cash handling device for the forecast period comprises retrieving a closing content for each of the plurality of cash denominations from the closing transaction data.

12. The computer program product of claim 10, wherein the forecast period is embodied as a first forecast period of a plurality of forecast periods, and wherein the plurality of forecast periods comprise the first forecast period and a second forecast period occurring consecutively after the first forecast period; and wherein the forecasting process additionally comprises determining a second forecast starting content for each of the plurality of cash denominations for the second forecast period at least in part by:

determining a forecast closing content for each of the plurality of cash denominations after the first forecast period based at least in part on one or more of: the closing transaction data and historical data relevant to the first forecast period.

\* \* \* \* \*